(12) United States Patent
Hwang et al.

(10) Patent No.: US 12,424,681 B2
(45) Date of Patent: *Sep. 23, 2025

(54) BATTERY PACK

(71) Applicant: SAMSUNG SDI CO., LTD., Yongin-si (KR)

(72) Inventors: Kum-Yul Hwang, Yongin-si (KR); Woongbin Kim, Yongin-si (KR); Junseop Kim, Yongin-si (KR); Kwan Il Oh, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 40 days.

This patent is subject to a terminal disclaimer.

(21) Appl. No.: 17/968,086

(22) Filed: Oct. 18, 2022

(65) Prior Publication Data

US 2023/0043564 A1 Feb. 9, 2023

Related U.S. Application Data

(62) Division of application No. 16/897,474, filed on Jun. 10, 2020, now Pat. No. 11,502,351.

(30) Foreign Application Priority Data

Nov. 4, 2019 (KR) .................. 10-2019-0139661

(51) Int. Cl.
H01M 10/657 (2014.01)
H01M 10/44 (2006.01)
(Continued)

(52) U.S. Cl.
CPC ....... H01M 10/6572 (2015.04); H01M 10/44 (2013.01); H01M 10/486 (2013.01);
(Continued)

(58) Field of Classification Search
CPC .......... H01M 10/6572; H01M 10/657; H01M 10/617; H01M 10/613; H01M 10/615;
(Continued)

(56) References Cited

U.S. PATENT DOCUMENTS 5,871,859 A * 2/1999 Parise .................. B60L 3/0046
429/62
11,502,351 B2 * 11/2022 Hwang ............... H01M 10/615
(Continued)

FOREIGN PATENT DOCUMENTS

JP 11-055869 A 2/1999
JP 11-150885 A 6/1999
(Continued)

OTHER PUBLICATIONS

Abstract of JP 2005/117824, Jiro Tsuchiya, Electric Storage Device, Apr. 28, 2005.*
(Continued)

Primary Examiner — Raymond Alejandro
(74) Attorney, Agent, or Firm — Lee IP Law, P.C.

(57) ABSTRACT

A battery pack having at least one cell module that is connected between a plurality of pack terminals, the battery pack including: at least one thermoelectric element disposed at each of the at least one cell modules; a thermoelectric element power supply circuit configured to supply a driving voltage to the at least one thermoelectric element; and a controller configured to control the thermoelectric element power supply circuit to transfer a first voltage that is supplied for driving the thermoelectric element from a charger as the driving voltage for the at least one thermoelectric element when a temperature of the at least one cell module is out of a first range in a charging mode, the first
(Continued)

voltage being different from a second voltage that is a charging voltage supplied to the battery pack from the charger.

6 Claims, 14 Drawing Sheets

(51) Int. Cl.
  *H01M 10/48* (2006.01)
  *H01M 10/613* (2014.01)
  *H01M 10/615* (2014.01)
  *H01M 10/63* (2014.01)
  *H01M 10/6572* (2014.01)
  *H02J 7/00* (2006.01)

(52) U.S. Cl.
  CPC ....... *H01M 10/613* (2015.04); *H01M 10/615* (2015.04); *H01M 10/63* (2015.04); *H02J 7/007194* (2020.01)

(58) Field of Classification Search
  CPC .... H01M 10/63; H01M 10/637; H01M 10/44; H01M 10/441; H01M 10/486; H02J 7/007194; H02J 7/007192
  See application file for complete search history.

(56) References Cited

U.S. PATENT DOCUMENTS

| | | | |
|---|---|---|---|
| 2007/0131716 A1* | 6/2007 | Prabucki | B67D 3/0009 222/146.6 |
| 2008/0036425 A1 | 2/2008 | Tashiro et al. | |
| 2009/0069045 A1* | 3/2009 | Cheng | H04M 1/0202 455/556.1 |
| 2013/0169039 A1* | 7/2013 | Zhu | H02M 3/1584 307/10.1 |
| 2015/0123481 A1 | 5/2015 | Reihlen et al. | |
| 2017/0314824 A1 | 11/2017 | Kossakovski et al. | |
| 2020/0381782 A1* | 12/2020 | Yang | B60L 1/00 |
| 2023/0039250 A1* | 2/2023 | Hwang | H01M 10/44 |

FOREIGN PATENT DOCUMENTS

| | | | | |
|---|---|---|---|---|
| JP | 2005117824 A | * | 4/2005 | ........... H02J 7/00 |
| JP | 2008-010295 A | | 1/2008 | |
| JP | 2008-041614 A | | 2/2008 | |
| JP | 2010-282878 A | | 12/2010 | |
| JP | 2012-216422 A | | 11/2012 | |
| JP | 2012-234749 A | | 11/2012 | |
| JP | 2013-048063 A | | 3/2013 | |
| JP | 2013-131336 A | | 7/2013 | |
| KR | 10-1698401 B1 | | 1/2017 | |
| KR | 10-2017-0047767 A | | 5/2017 | |

OTHER PUBLICATIONS

European Search Report dated Dec. 7, 2020.
Korean Office Action dated Apr. 8, 2021.

* cited by examiner

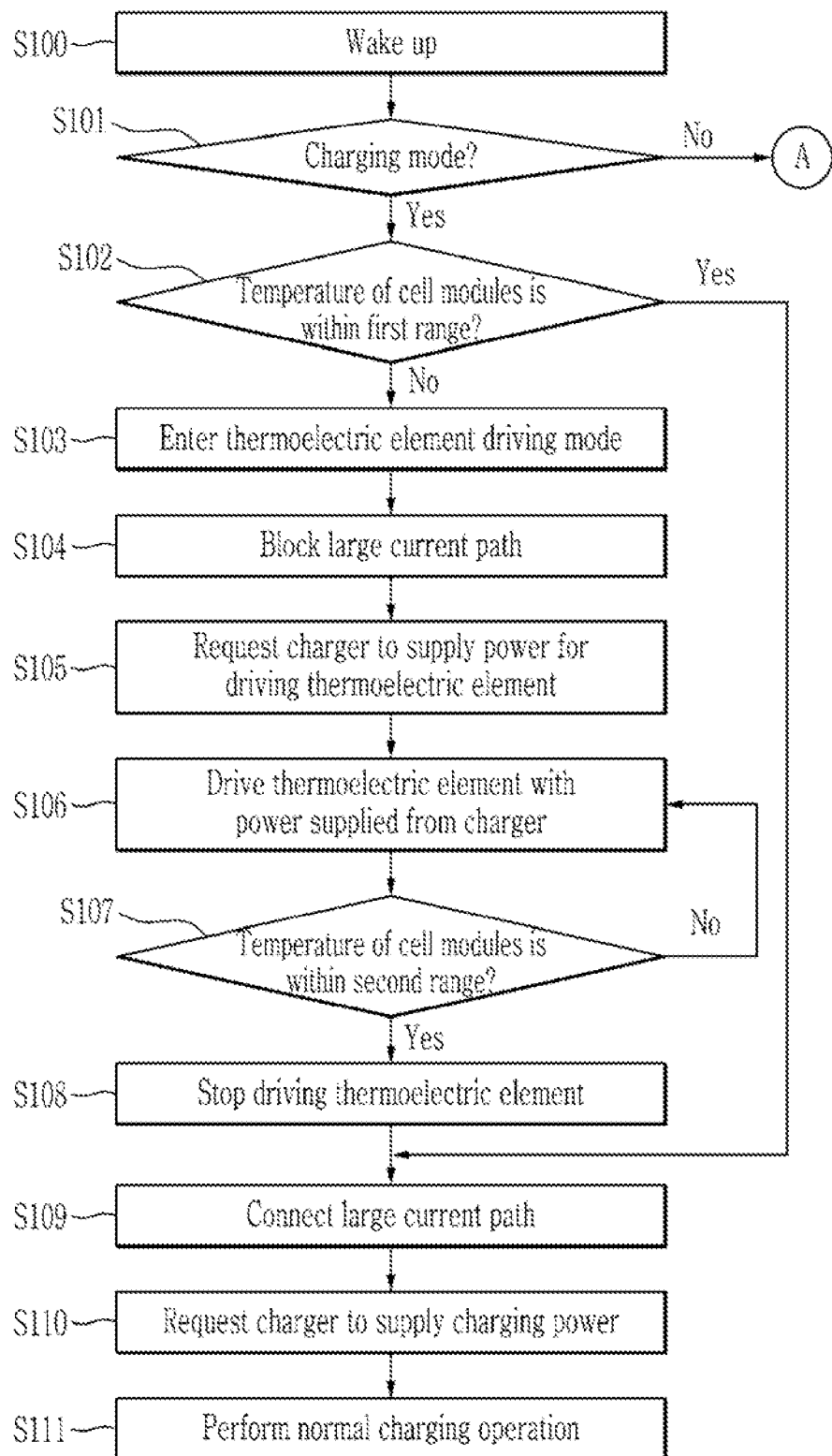

BATTERY PACK

CROSS-REFERENCE TO RELATED APPLICATIONS

This is a divisional application based on pending application Ser. No. 16/897,474, filed Jun. 10, 2020, now U.S. Pat. No. 11,502,351 B2, the entire contents of which is hereby incorporated by reference.

Korean Patent Application No. 10-2019-0139661, filed on Nov. 4, 2019, in the Korean Intellectual Property Office, and entitled: "Battery Pack and Control Method Thereof," is incorporated by reference herein in its entirety.

BACKGROUND OF THE INVENTION

1. Field

Embodiments relate to a battery pack and a control method thereof.

2. Description of the Related Art

A battery pack may include a plurality of battery modules connected in series or in parallel with each other. Each of the battery modules may include a plurality of cells connected in series or in parallel with each other.

The above information disclosed in this Background section is only for enhancement of understanding of the background of the invention and therefore it may contain information that does not form the prior art that is already known in this country to a person of ordinary skill in the art.

SUMMARY

Embodiments are directed to a battery pack having at least one cell module that is connected between a plurality of pack terminals, the battery pack including: at least one thermoelectric element disposed at each of the at least one cell modules; a thermoelectric element power supply circuit configured to supply a driving voltage to the at least one thermoelectric element; and a controller configured to control the thermoelectric element power supply circuit to transfer a first voltage that is supplied for driving the thermoelectric element from a charger as the driving voltage for the at least one thermoelectric element when a temperature of the at least one cell module is out of a first range in a charging mode, the first voltage being different from a second voltage that is a charging voltage supplied to the battery pack from the charger.

The controller may request the charger to supply the first voltage when the temperature of the at least one cell module is out of the first range in the charging mode.

The controller may stop driving of the at least one thermoelectric element and request the charger to supply the second voltage for charging the at least one cell module when the temperature of the at least one cell module is within a second range during driving of the at least one thermoelectric element in the charging mode, the second range being within the first range.

The controller may transmit state information including the temperature of the at least one cell module to the charger in the charging mode, and the controller may request the charger to supply the first voltage to the battery pack when the temperature of the at least one cell module is out of the first range.

The controller may request the charger to stop supplying the first voltage and supply the second voltage to the battery pack when the temperature of the at least one cell module during driving of the at least one thermoelectric element is within a second range during driving of the at least one thermoelectric element, and the controller may stop driving the at least one thermoelectric element when the temperature of the at least one cell module is within the second range during the driving of the at least one thermoelectric element, the second range being within the first range.

The thermoelectric element power supply circuit may receive the first voltage from the charger through the pack terminals.

The thermoelectric element power supply circuit may receive the first voltage from the charger through input terminals that are separate from the pack terminals through which the second voltage is input from the charger.

The battery pack may further include a main switch connected between any one of the pack terminals and the at least one cell module to control a flow of charge and discharge currents. The controller may control the main switch to be off while the at least one thermoelectric element is driven in the charging mode.

The battery pack may further include a control circuit disposed at each of the at least one cell modules to control a direction of a current supplied to the at least one thermoelectric element. The controller may control the control circuit to set the direction of the current supplied to the at least one thermoelectric element depending on the temperature of the at least one cell module.

The controller may control the thermoelectric element power supply circuit to transfer an internal voltage of the battery pack as a driving voltage of the at least one thermoelectric element when the temperature of the at least one cell module is out of a third range in a discharge mode.

Embodiments are directed to a battery pack having at least one cell module that is connected between a plurality of pack terminals, the battery pack including: at least one thermoelectric element disposed at each of the at least one cell modules; a thermoelectric element power supply circuit including a voltage converter configured to convert a voltage input through the pack terminals and transfer a converted voltage as a driving voltage to the at least one thermoelectric element; and a controller configured to control the voltage converter to transfer the driving voltage to the at least one thermoelectric element when a temperature of the at least one cell module is out of a first range in a charging mode.

The controller may request a charger to supply power for driving the at least one thermoelectric element when the temperature of the at least one cell module is out of the first range in the charging mode.

The controller may transmit state information including the temperature of the at least one cell module to a charger in the charging mode, and the controller may request the charger to supply a voltage for driving the at least one thermoelectric element to the battery pack when the temperature of the at least one cell module is out of the first range.

The battery pack may further include a main switch connected between any one of the pack terminals and the at least one cell module to control a flow of charge and discharge currents. The controller may control the main switch to be in an off state while voltage for driving the thermoelectric element is supplied from a charger in the charging mode.

The battery pack may further include a control circuit disposed in each of the at least one cell modules to control a direction of a current supplied to the at least one thermoelectric element. The controller may control the control circuit to set the direction of the current supplied to the at least one thermoelectric element depending on the temperature of the at least one cell module.

The controller may control the thermoelectric element power supply circuit to transfer an internal voltage of the battery pack as the driving voltage of the at least one thermoelectric element when the temperature of the at least one cell module is out of a third range in a discharge mode.

Embodiments are also directed to a battery pack having a cell module that is connected between a plurality of pack terminals, the battery pack including: a thermoelectric element disposed at the cell module; a thermoelectric element driver disposed at the cell module and configured to control driving of the thermoelectric element; a voltage converter disposed at the cell module and configured to output a driving voltage to the thermoelectric element by converting a voltage across a rechargeable battery cell included in the cell module; and a controller configured to request power for driving the thermoelectric element from a charger, and to control the thermoelectric element driver and the voltage converter such that a driving voltage is transferred to the thermoelectric element when a temperature of the cell module is out of a first range in a charging mode. A current supplied from the charger during driving the thermoelectric element may correspond to a consumption current of the thermoelectric element.

The controller may control the thermoelectric element and the voltage converter to stop driving the thermoelectric element when the temperature of the cell module is within a second range during driving the thermoelectric element in the charging mode, the second range being within the first range.

The battery pack may further include a main switch connected between any one of the pack terminals and the cell module to control a flow of charge and discharge currents. The controller may control the main switch to be off while the thermoelectric element is driven in the charging mode.

The controller may control the thermoelectric element driver to adjust a direction of a current supplied to the thermoelectric element depending on the temperature of the cell module.

Embodiments are also directed to a method of controlling a battery pack having at least one cell module that is connected between a plurality of pack terminals, the method including: blocking a current path between the pack terminals and the at least one cell module when a temperature of the at least one cell module is out of a first range in a charging mode; driving at least one thermoelectric element disposed at each of the at least one cell modules with a first voltage that is supplied for driving the thermoelectric element from a charger; connecting the current path when the temperature of the at least one cell module is within a second range during driving the at least one thermoelectric element; and charging the at least one cell module with a second voltage that is supplied for charging from the charger, the second voltage being different from the first voltage.

The first and second voltages may be input through the pack terminals.

The second voltage may be input through the pack terminals, and the first voltage may be input through input terminals that are separate from the pack terminals.

Embodiments are also directed to a method of controlling a battery pack having at least one cell module that is connected between a plurality of pack terminals, the method including: blocking a current path between the pack terminals and the at least one cell module when a temperature of the at least one cell module is out of a first range in a charging mode; requesting a charger to supply power for driving a thermoelectric element; driving at least one thermoelectric element disposed at each of the at least one cell modules with a voltage that is dropped from a voltage supplied from the charger; connecting the current path when the temperature of the at least one cell module is within a second range during driving the at least one thermoelectric element; and charging the at least one cell module with a voltage supplied from the charger.

Embodiments are also directed to a method of controlling a battery pack having at least one cell module that is connected between a plurality of pack terminals, the method including: requesting a charger to supply power for driving a thermoelectric element when a temperature of the at least one cell module is out of a first range; driving at least one thermoelectric element by supplying a voltage to at least one thermoelectric element disposed at the at least one cell module through a rechargeable battery cell included in a corresponding cell module; and charging the at least one cell module with a voltage supplied from the charger when the temperature of the at least one cell module is within a second range during driving the at least one thermoelectric element, a current supplied from the charger during driving the at least one thermoelectric element corresponding to a consumption current of the at least one thermoelectric element.

BRIEF DESCRIPTION OF THE DRAWINGS

Features will become apparent to those of skill in the art by describing in detail example embodiments with reference to the attached drawings in which:

FIG. 2A and FIG. 2B schematically illustrate a control method of the battery pack according to the first example embodiment.

DETAILED DESCRIPTION

Figure 1:
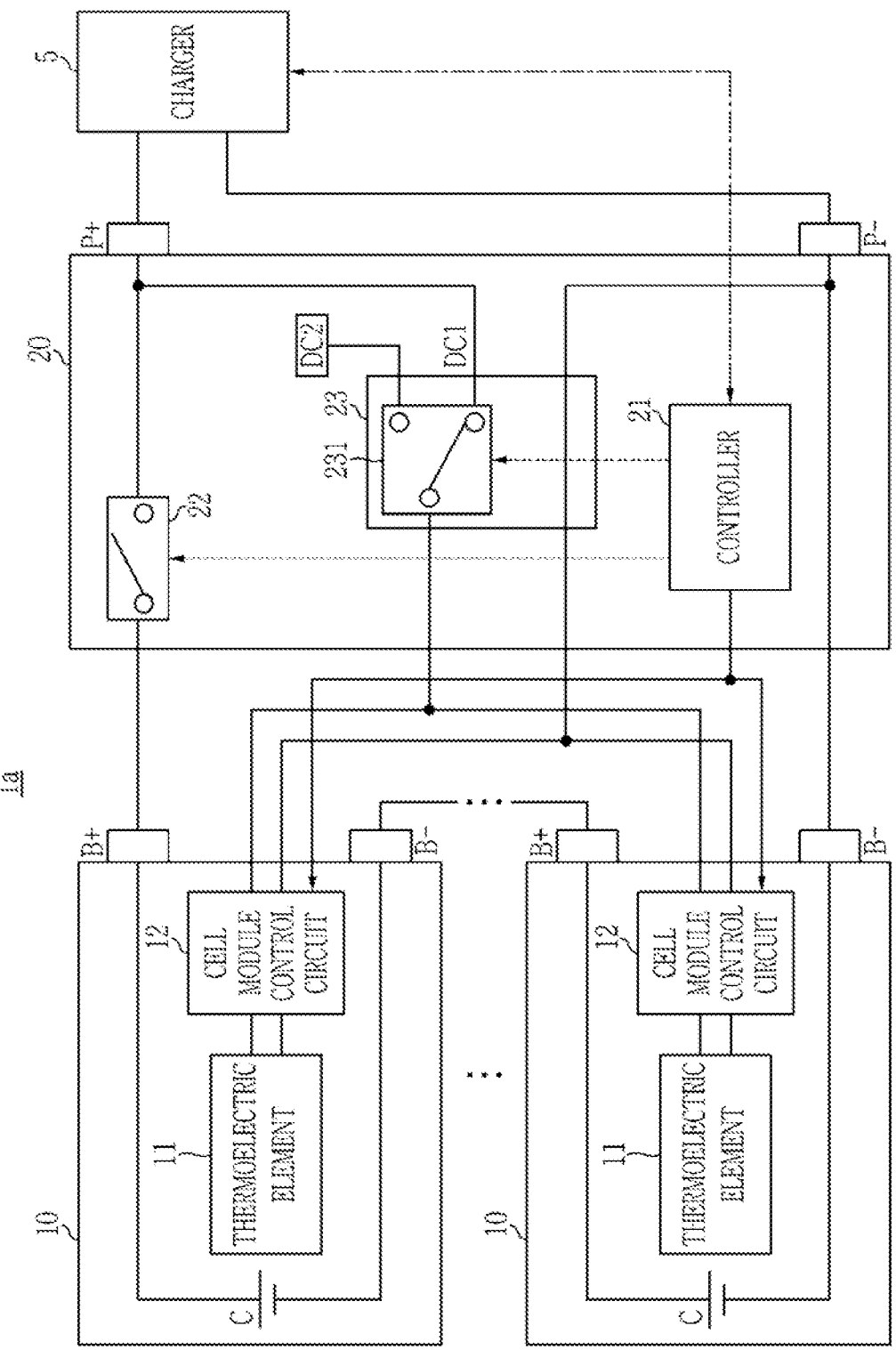
FIG. 1 schematically illustrates a battery pack according to a first example embodiment, in which the battery pack is connected to a charger.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art.

In the drawing figures, the dimensions of layers and regions may be exaggerated for clarity of illustration. Like reference numerals refer to like elements throughout.

A case of electrically connecting two constituent elements includes not only a case of directly connecting the constituent elements but also a case of connecting the constituent elements via another constituent element therebetween. The constituent element therebetween may include a switch, a resistor, a capacitor, and the like. In describing example embodiments, an expression of connection indicates electrical connection unless explicitly described to be direct connection.

Hereinafter, a battery pack and a control method of the battery pack according to example embodiments will be described with reference to the drawings.

FIG. 1 schematically illustrates a battery pack according to a first example embodiment, in which the battery pack is connected to a charger.

Referring to FIG. 1, a battery pack 1a according to the first example embodiment may include a plurality of pack terminals, e.g., pack terminals P+ and P−, a plurality of cell modules 10, and a battery management system (BMS) module 20.

The cell modules 10 may be electrically connected in series or in parallel between the pack terminals P+ and P−, to receive power from an external charger 5 through the pack terminals P+ and P− or to supply power to an external load. In FIG. 1, a case in which the cell modules 10 are connected to each other in series between the pack terminals P+ and P− is illustrated as an example, but this is merely for explaining an example embodiment, and a connection structure of the cell modules 10 between the pack terminals P+ and P− may be variously modified.

Each of the cell modules 10 may include a rechargeable battery cell C, a thermoelectric element 11, and a cell module control circuit 12.

The rechargeable battery cell C may be disposed inside a case of the cell module 10, and may be electrically connected to neighboring cell modules and/or pack terminals P+ and P− through electrode terminals B+ and B− of the cell module 10.

The thermoelectric element 11 may be disposed, e.g., outside the case of the cell module 10. The cell module 10 may be heated or cooled by the thermoelectric element 11 under control of the cell module control circuit 12.

The thermoelectric element 11 may be a Peltier element using a Peltier effect that generates or absorbs heat in proportion to the current in addition to Joule heat at a junction when two different metal conductors are joined to each other to flow a current. The thermoelectric element 11 may heat or cool the cell module 10 by dissipating or emitting heat (heating) or absorbing heat (cooling) depending on a direction of the current.

In FIG. 1, a case in which each cell module 10 includes one thermoelectric element 11 is illustrated as an example, but this is merely for explaining an example embodiment, and a number of thermoelectric elements 11 included in each cell module 10 may be variously modified.

The cell module control circuit 12 may control driving of the thermoelectric element 11 based on a control signal of a controller 21. Thus, the cell module control circuit 12 may activate or deactivate the thermoelectric element 11 by supplying driving power to the thermoelectric element 11 or cutting off the driving power based on the control signal received from the controller 21. In addition, the cell module control circuit 12 may control the heat dissipation or heat absorption of the thermoelectric element 11 by adjusting the direction of the current applied to the thermoelectric element 11 based on the control signal received from the controller 21. The driving power supplied from the cell module control circuit 12 to each thermoelectric element 11 may be supplied by a thermoelectric element power supply circuit 23 in the BMS module 20 to be described below.

In addition to driving the thermoelectric element 11, the cell module control circuit 12 may detect a cell voltage of the rechargeable battery cell C and/or detect a temperature of the cell modules 10 through a temperature sensor.

The BMS module 20 may perform input and output control of the battery pack 1a, a protection operation, communication with the charger 5, and the like.

The BMS module 20 may include a main switch 22 connected between any one of the pack terminals P+ and P− and the cell modules 10. The BMS module 20 may include a controller 21 configured to control driving of the main switch 22.

The controller 21 may collect information such as cell voltages and temperatures from the cell module control circuit 12 of each cell module 10, and may obtain a state of charge (SOC) of each rechargeable battery cell C based on the information. In addition, the controller 21 may detect whether the charger 5 or a load and the battery pack 1a are connected, or may detect a charge/discharge current between the charger 5 or the load and the battery pack 1a.

The controller 21 may transmit and receive various information, control signals, and the like with respect to the charger 5 through, e.g., a control area network (CAN) communication bus or network. For example, the controller 21 may transfer state information obtained for each cell module 10 or the battery pack 1a (e.g., cell voltages, temperatures, and SOCs of each cell module 10, the charging and discharging currents of the battery pack 1a, and the like) to the charger 5.

The controller 21 may control an ON or OFF state of the main switch 22 to connect or block a current path (which may be referred to herein as a "large current path") between the charger 5 or the load and the battery pack 1a. Herein, turning on a switch indicates controlling the switch to a closed or conductive state, and turning off a switch indicates controlling the switch to an open or non-conductive state.

When the charger 5 or the load is connected to the battery pack 1a, the controller 21 may transfer the charging current supplied from the charger 5 to the cell modules 10, or may control the main switch 22 to an ON state in order to transfer a discharge current supplied from the cell modules 10 to the load. Accordingly, a current path (the large current path) may be formed between the charger 5 or the load and the battery pack 1a, and thus a charging current or a discharging current may flow between the charger 5 or the load and the battery pack 1a. In addition, the controller 21 may detect a situation that calls for a protection operation (such as an overvoltage, an overcurrent, or an internal short circuit situation, etc.) of each cell module 10 based on various state information (e.g., charging and discharging currents, voltages, temperatures, SOCs of each cell module 10, etc.) obtained for the battery pack 1a, and in this situation, the controller 21 may control the main switch 22 to be in an OFF state to cut off the electrical connection between the pack terminals P+ and P− and the cell modules 10.

The BMS module 20 may further include a thermoelectric element power supply circuit 23 for controlling driving power supply of the thermoelectric element 11 disposed at each cell module 10. The thermoelectric element power supply circuit 23 may transfer any one of a voltage DC1 supplied from the charger 5 and a voltage DC2 supplied from an inside of the battery pack 1a (e.g., a voltage supplied from an inside of the BMS module 20) to the cell module control circuit 12 of each cell module 10).

The thermoelectric element power supply circuit 23 may transfer the voltage DC1 supplied from the charger 5 to the cell module control circuit 12 when the thermoelectric element 11 is to be driven in the charging mode.

The thermoelectric element power supply circuit 23 may transfer the internal voltage DC2 of the battery pack 1a to the cell module control circuit 12 when the thermoelectric element 11 is to be driven in the discharging mode. Herein, the internal voltage DC2 of battery pack 1a may be a voltage obtained by dropping a voltage supplied by the cell modules 10, a voltage supplied by some of the cell modules 10 constituting the battery pack 1a, or a voltage supplied by a separate low voltage battery module.

The thermoelectric element power supply circuit 23 may include a switch 231, e.g., a single pole double throw (SPDT) switch, including a first input terminal electrically connected to the pack terminal P+ to which the voltage DC1 supplied from the charger 5 is input, a second input terminal to which the internal voltage DC2 of the battery pack 1a is input, and an output terminal for output of a voltage to the cell module control circuit 12.

The controller 21 may control the thermoelectric element power supply circuit 23 to be activated such that power for driving the thermoelectric element 11 is supplied to the cell module control circuits 12 when the thermoelectric element 11 is to be driven. Thus, the controller 21 may control the thermoelectric element power supply circuit 23 to transfer any one of the voltage DC1 supplied from the charger 5 and the voltage DC2 supplied from the inside of the battery pack 1a to the cell module control circuit 12 of each cell module 10. In addition, the controller 21 may transfer a control signal indicating the direction of the current supplied to the thermoelectric element 11 to the cell module control circuit 12 depending on a desired operation among heating and cooling when the thermoelectric element 11 is to be driven.

The controller 21 may turn off the main switch 22 to prevent charging and discharging while the thermoelectric element 11 is being driven.

In FIG. 1, a case in which the thermoelectric element power supply circuit 23 is included in the BMS module 20 has been illustrated as an example, but this is merely for describing one example embodiment, and the thermoelectric element power supply circuit 23 may be provided separately from the BMS module 20.

Figure 2B:
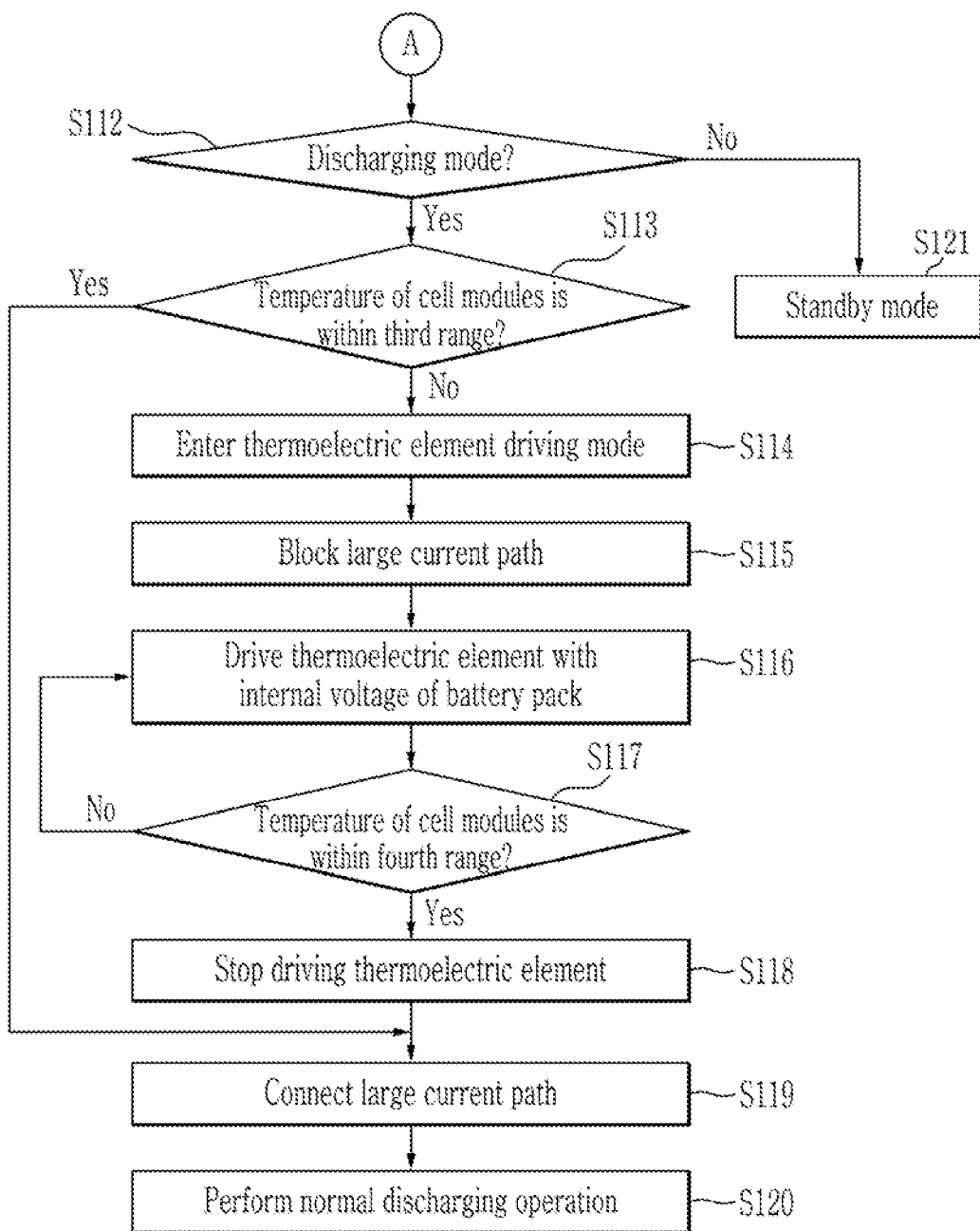

FIG. 2A and FIG. 2B schematically illustrate a control method of the battery pack according to the first example embodiment. The control method of FIG. 2A and FIG. 2B may be performed by the battery pack 1a of FIG. 1.

Referring to FIG. 2A and FIG. 2B, as the battery pack 1a wakes up (S100), the controller 21 of the battery pack 1a determines whether a current operation mode of the battery pack 1a is a charging mode (S101). Then, when the current operation mode of the battery pack 1a is the charging mode, it is determined whether a temperature of the cell modules 10 is within a predetermined first range (S102). A case when the current operation mode of the battery pack 1a is not in the charging mode is described below.

In operation S102, the first range indicates a temperature range in which the cell modules 10 can be normally charged, and the controller 21 may compare a representative value (e.g., an average value, a minimum value, a maximum value, etc.) among temperature information detected for the cell modules 10 with the first range. For example, the first range may be defined as 0° C. to 45° C.

In operation S102, when the temperature of the cell modules 10 is within the predetermined first range, the controller 21 controls the main switch 22 to be in an ON state to connect a large current path (S109), and requests the charger 5 to supply power for charging (S110). The charger 5 receiving this request supplies a charging voltage to the battery pack 1a, and a normal charging operation of the cell modules 10 is performed by the power supplied from the charger 5 (S111). When the main switch 22 is already on, operation S109 may be omitted.

On the other hand, in operation S102, when the controller 21 determines that the temperature of the cell modules 10 is out of the predetermined first range, the controller 21 enters a thermoelectric element driving mode (S103). In addition, the controller 21 blocks the large current path by controlling the main switch 22 to be in an OFF state in order to block charging while the thermoelectric element driving mode is operated (S104). When the main switch 22 is already off, operation S104 may be omitted.

In addition, as the controller 21 enters the thermoelectric element driving mode, the controller 21 requests the charger 5 to supply the power for driving the thermoelectric element 11 through CAN communication or the like (S105). The charger 5 receiving this request outputs the voltage DC1 for driving the thermoelectric element 11 to the battery pack 1a, and the thermoelectric element power supply circuit 23 transfers the voltage DC1 applied from the charger 5 to the thermoelectric elements 11 under the control of the controller 21 to drive the thermoelectric elements 11 (S106). The voltage DC1 applied for driving the thermoelectric element 11 from the charger 5 may be lower than the voltage that is applied for charging the cell modules 10 from the charger 5.

The controller 21 may control the switch 231 and the cell module control circuit 12 in the thermoelectric element power supply circuit 23 such that the voltage for driving the thermoelectric element applied from the charger 5 is transferred to each thermoelectric element 11 through the thermoelectric element power supply circuit 23 and the cell module control circuit 12. In addition, the controller 21 may determine whether cooling or heating is called for depending on the temperature of the cell modules 10, and may control the cell module control circuits 12 depending on the determination result to control the direction of the current supplied to the thermoelectric element 11.

In operation S106, the controller 21 may control the cell module control circuits 12 to control the thermoelectric elements 11 to operate alternately with respect to one another. For example, in a case where a number of thermoelectric elements 11 disposed in the battery pack 1a is large, a large current may be consumed if all the thermoelectric elements 11 are driven at one time. Accordingly, the controller 21 may reduce an amount of current consumed at one time for driving the thermoelectric elements 11 by dividing the thermoelectric elements 11 into a plurality of groups (e.g., odd and even groups), and controlling the cell module control circuits 12 such that each group operates alternately.

Subsequently, when the temperature of the cell modules 10 is within the second range due to the driving of the thermoelectric elements 11 (S107), the controller 21 controls the thermoelectric element power supply circuit 23 and the cell module control circuits 12 to allow the driving of the thermoelectric elements 11 to be stopped (S108). In addition, the large current path is connected by turning on the main switch 22 (S109), and the charger is requested to supply the charging power through the CAN communication or the like (S110). The charger 5 receiving this request outputs a charging voltage to the battery pack 1a, and a normal charging operation of the cell modules 10 is performed by the power applied from the charger 5 (S111).

In operation S107, the second range is set to be within the first range, and the controller 21 may compare a representative value (e.g., an average value, a minimum value, a maximum value, etc.) among temperature information detected for the cell modules 10 with the second range. For example, the second range may be defined as 5° C. to 40° C.

Referring again to operation S101, when a current operation mode of the battery pack 1a is not the charging mode, the controller 21 determines whether the current operation mode of the battery pack 1a is the discharge mode (S112). Then, when the current operation mode of the battery pack 1a is the discharging mode, it is determined whether a temperature of the cell modules 10 is within a predetermined third range (S113).

In operation S113, the third range indicates a temperature range in which the cell modules 10 can be normally operated, and the controller 21 may compare a representative value (e.g., an average value, a minimum value, a maximum value, etc.) among temperature information detected for the cell modules 10 with the third range. For example, the third range may be defined as −20° C. to 60° C.

In operation S113, when the temperature of the cell modules 10 is within a predetermined third range, the controller 21 controls the main switch 22 to be in an ON state to connect a large current path (S119), and thus power is supplied from the battery pack 1a to the external load through the pack terminals P+ and P− to perform a normal discharge operation of the cell modules 10 (S120). When the main switch 22 is already on, operation S119 may be omitted.

On the other hand, in operation S113, when the controller 21 determines that the temperature of the cell modules 10 is out of the predetermined third range, the controller 21 determines that the thermoelectric element 11 is to be driven and enters the thermoelectric element driving mode (S114). In addition, the controller 21 blocks the large current path by controlling the main switch 22 to be in an OFF state in order to block discharging while the thermoelectric element driving mode is operated (S115). When the main switch 22 is already off, operation S115 may be omitted.

In addition, as the controller 21 enters the thermoelectric element driving mode, the controller 21 drives the thermoelectric elements 11 with the internal voltage DC2 of the battery pack 1a (S116).

In operation S116, the controller 21 may control the switch 231 and the cell module control circuit 12 in the thermoelectric element power supply circuit 23 such that the voltage supplied from the battery pack 1a is transferred to each thermoelectric element 11 through the thermoelectric element power supply circuit 23 and the cell module control circuit 12. In addition, the controller 21 may determine whether cooling or heating is called for depending on the temperature of the cell modules 10, and may control the cell module control circuits 12 depending on the determination result to control the direction of the current supplied to the thermoelectric element 11.

In operation S116, the controller 21 may control the cell module control circuits 12 to control the thermoelectric elements 11 to operate alternately. Thus, the controller 21 may reduce an amount of current consumed at one time for driving the thermoelectric elements 11 by dividing the thermoelectric elements 11 into a plurality of groups (e.g., odd and even groups), and controlling the cell module control circuits 12 such that each group operates alternately.

When the temperature of the cell modules 10 is within the fourth range (S117), the controller 21 controls the thermoelectric element power supply circuit 23 and the cell module control circuits 12 to allow the driving of the thermoelectric elements 11 to be stopped (S118), and turns on the main switch 22 to connect a large current path (S119). Accordingly, power is supplied from the battery pack 1a to the external load through the pack terminals P+ and P− to perform a normal discharge operation of the cell modules 10 (S120).

In operation S117, the fourth range is set to be within the third range, and the controller 21 may compare a representative value (e.g., an average value, a minimum value, a maximum value, etc.) among temperature information detected for the cell modules 10 with the fourth range. For example, the fourth range may be defined as −15° C. to 55° C.

In operation S112, when a current operation mode of the battery pack 1a is not the discharging mode, the battery pack 1a operates in a standby mode (S121).

In the above-described first example embodiment, in the charging mode, the controller 21 in the battery pack 1a determines whether the thermoelectric element 11 is driven based on the temperature of the cell modules 10, and the charger 5 supplies the power for driving the thermoelectric element 11 in response to the request of the battery pack 1a, but the charger 5 instead of the battery pack 1a may determine whether the thermoelectric element of the battery pack 1a is driven.

Figure 3:
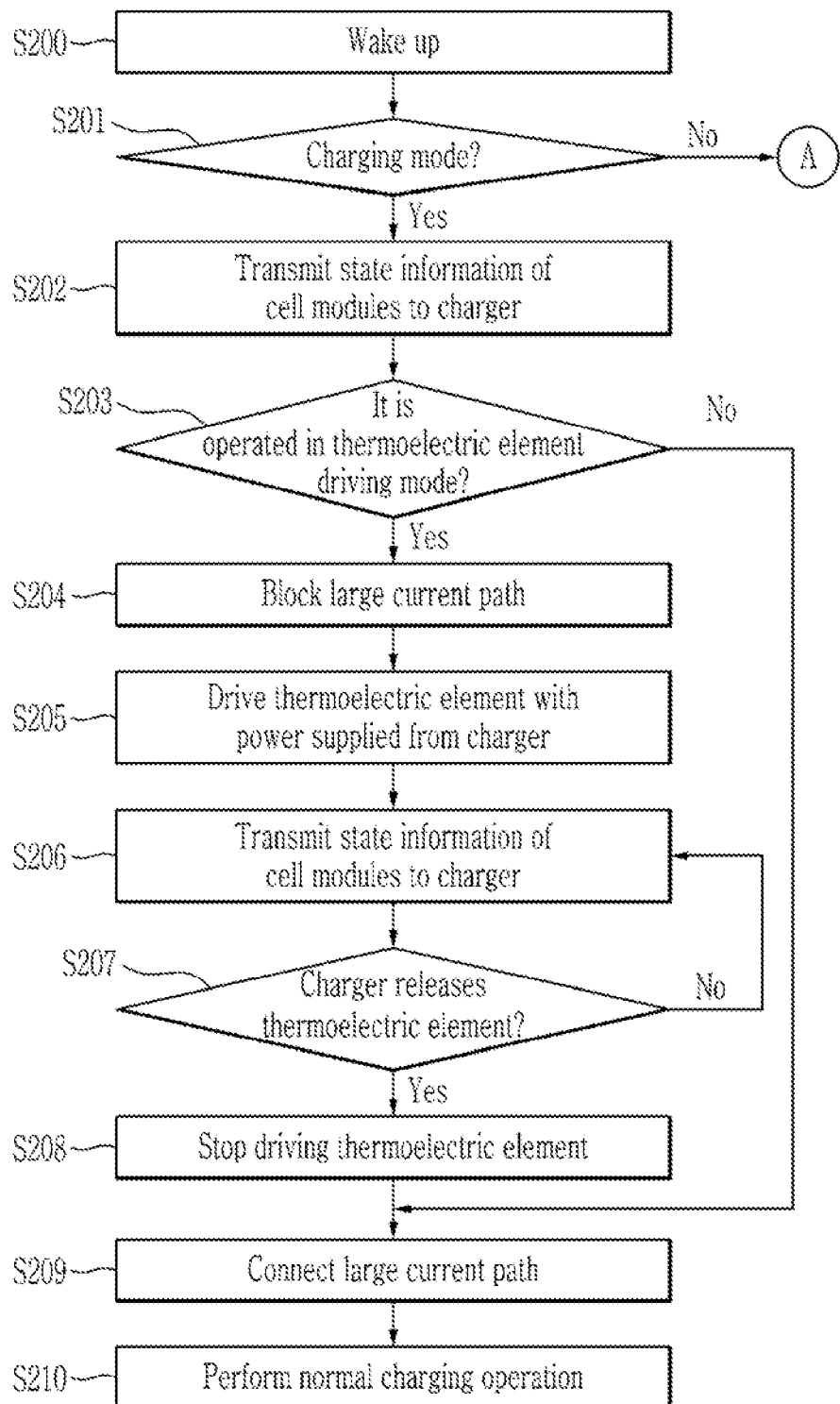
FIG. 3 schematically illustrates a control method of a battery pack according to a second example embodiment.
Figure 4:
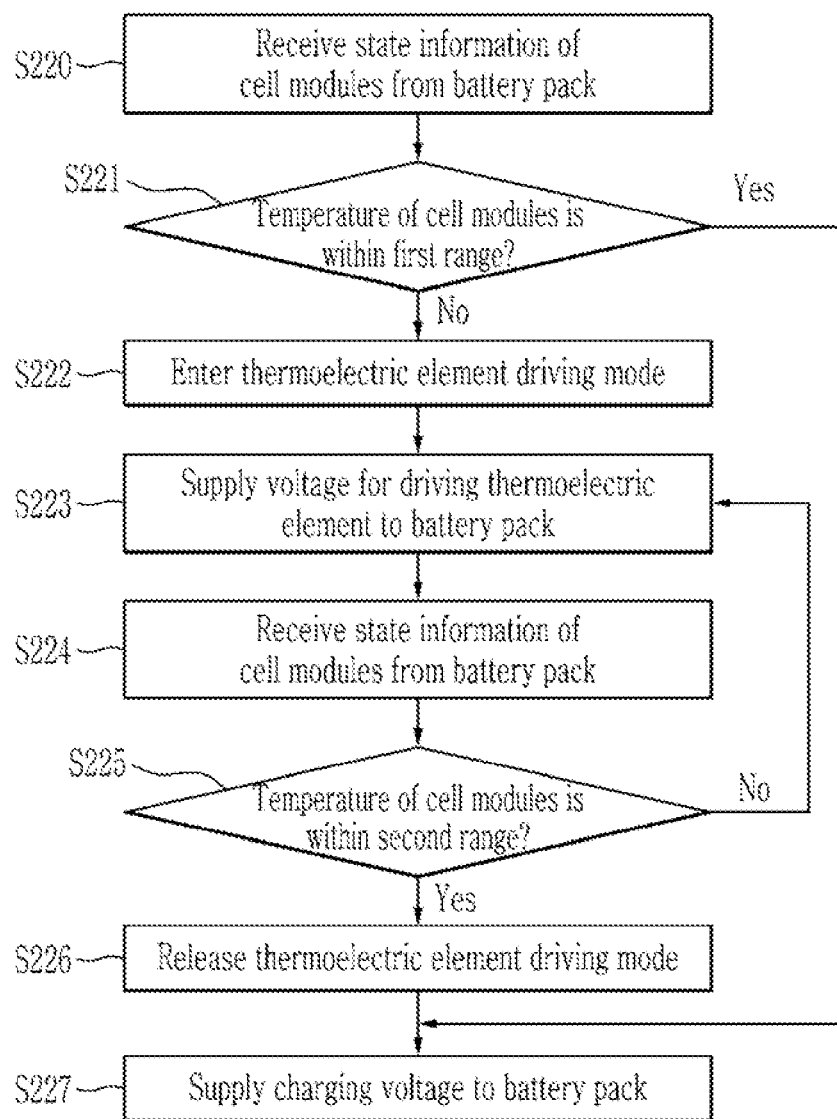
FIG. 4 schematically illustrates a battery pack charging method of a charger according to the second example embodiment.

FIG. 3 schematically illustrates a control method of a battery pack according to a second example embodiment, and FIG. 4 schematically illustrates a battery pack charging method of a charger according to the second example embodiment, which illustrate a case of determining whether to drive the thermoelectric element by the charger of FIG. 1. The control method of FIG. 3 and the battery pack charging method of FIG. 4 may be performed by the battery pack 1a and the charger 5 of FIG. 1, respectively.

Referring to FIG. 3 and FIG. 4, as the battery pack 1a wakes up (S200), the controller 21 of the battery pack 1a determines whether a current operation mode of the battery pack 1a is a charging mode (S201). When the current operation mode of the battery pack 1a is the charging mode, state information (cell voltage, temperature, etc.) of the cell modules 10 is transmitted to the charger 5 through the CAN communication (S202).

As the charger 5 receives the state information of the cell modules 10 from the battery pack 1a (S220), it is determined based on the state information whether the temperature of the cell modules 10 is within a predetermined first range (S221). Then, when it is determined that the temperature of the cell modules 10 is out of the predetermined first range, the cell module 10 enters the thermoelectric element driving mode (S222) and supplies the voltage DC1 for driving the thermoelectric element 11 to the battery pack 1a (S223). On the other hand, in operation S221, when the temperature of the cell modules 10 is determined to be within the first range, the charger 5 directly supplies the charging voltage to the battery pack 1a without driving the thermoelectric element 11 (S227).

In operation S221, the first range indicates a temperature range in which the cell modules 10 can be normally charged, and the charger 5 may compare a representative value (e.g., an average value, a minimum value, a maximum value, etc.) among temperature information detected for the cell modules 10 with the first range. For example, the first range may be defined as 0° C. to 45° C.

In operation S223 and operation S227, the voltage DC1 supplied for driving the thermoelectric element 11 from the charger 5 may be lower than the voltage supplied for charging the cell modules 10 from the charger 5.

The controller 21 of the battery pack 1a blocks the large current path (S204) by controlling the main switch 22 to the OFF state in order to block the charging when the charger 5 operates in the thermoelectric driving mode (S203). In addition, the thermoelectric element power supply circuit 23 transfers the voltage DC1 for driving the thermoelectric element supplied from the charger 5 to the thermoelectric elements 11 under the control of the controller 21 to drive the thermoelectric elements 11 (S205). When the main switch 22 is already off, operation S204 may be omitted.

In operation S203, the controller 21 of the battery pack 1a may recognize that the charger 5 operates in the thermoelectric element driving mode based on information received from the charger 5 through the CAN communication or the like.

In operation S205, the controller 21 may control the switch 231 and the cell module control circuit 12 in the thermoelectric element power supply circuit 23 such that the voltage for driving the thermoelectric element supplied from the charger 5 is transferred to each thermoelectric element 11 through the thermoelectric element power supply circuit 23 and the cell module control circuit 12. In addition, the controller 21 may determine whether cooling or heating is called for depending on the temperature of the cell modules 10, and may control the cell module control circuits 12 depending on the determination result to control the direction of the current supplied to the thermoelectric element 11.

In operation S205, the controller 21 may control the cell module control circuits 12 to control the thermoelectric elements 11 to operate alternately. When a number of thermoelectric elements 11 disposed in the battery pack 1a is large, a large current may be consumed by the thermoelectric elements 11. Accordingly, the controller 21 may reduce an amount of current consumed at one time for driving the thermoelectric elements 11 by dividing the thermoelectric elements 11 into a plurality of groups (e.g., odd and even groups), and controlling the cell module control circuits 12 such that each group operates alternately.

Meanwhile, the controller 21 of the battery pack 1a may continuously or regularly collect state information of the cell modules 10 while driving the thermoelectric element, and transmit the state information to the charger 5 (S206).

The charger 5 receives the state information of the cell modules 10 from the battery pack 1a (S224) while operating in the thermoelectric element driving mode. Based on the state information, it is determined whether the temperature of the cell modules 10 is within a predetermined second range (S225). Then, when the temperature of the cell modules 10 is within the second range, the thermoelectric element driving mode is released (S226), and a charging voltage is supplied to the battery pack 1a (S227).

In operation S225, the second range is set to be within the first range, and the charger 5 may compare a representative value (e.g., an average value, a minimum value, a maximum value, etc.) among temperature information detected for the cell modules 10 with the second range. For example, the second range may be defined as 5° C. to 40° C.

The controller 21 of the battery pack 1a controls the thermoelectric element power supply circuit 23 and the cell module control circuits 12 to stop the driving of the thermoelectric elements 11 when the charger 5 releases the thermoelectric element driving mode (S207). In addition, the main switch 22 is turned on to connect the large current path (S209). Accordingly, the normal charging operation of the cell modules 10 is performed by the charging voltage supplied from the charger 5 (S210).

In operation S207, the controller 21 of the battery pack 1a may recognize that the charger 5 releases the thermoelectric element driving mode based on information received from the charger 5 through the CAN communication or the like.

In the control method of the battery pack according to the second example embodiment, when the battery pack 1a operates in the discharge mode, the thermoelectric element 11 is driven or discharged in the same manner as the control method described with reference to FIG. 2B. Therefore, in order to avoid overlapping descriptions, the description of the control method when the battery pack 1a operates in the discharge mode will be omitted in the control method of the battery pack 1a according to the second example embodiment.

In the above-described first and second example embodiments, a case in which the voltage supplied from the charger 5 is transferred as the voltage for driving the thermoelectric element 11 without additional conversion has been described, but the voltage supplied from the charger 5 may be transferred as the voltage for driving the thermoelectric element 11 after being dropped through voltage conversion.

Figure 5:
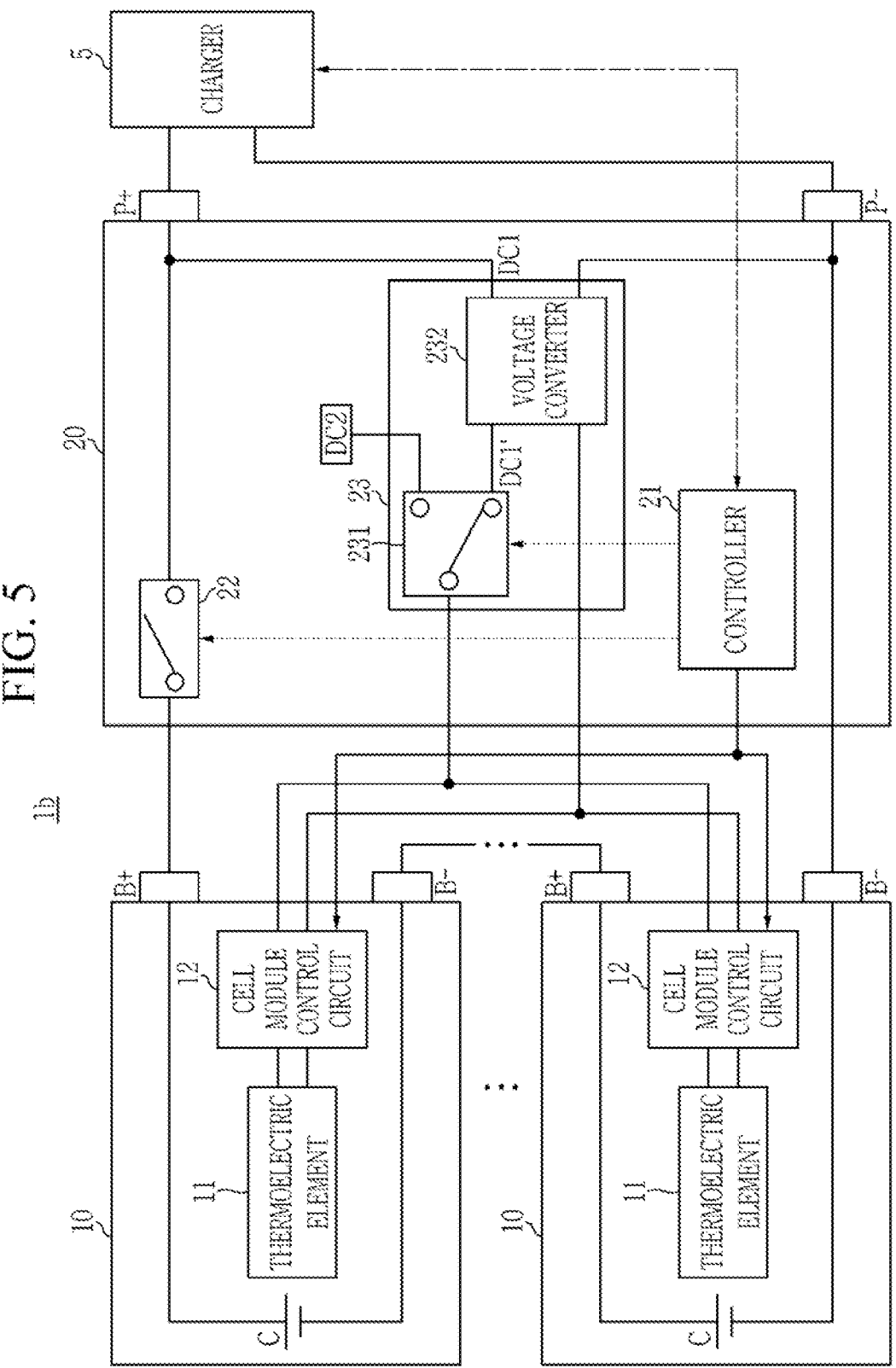
FIG. 5 schematically illustrates a battery pack according to a third example embodiment, in which the battery pack is connected to a charger.

FIG. 5 schematically illustrates a battery pack according to a third example embodiment, and illustrates a battery pack connected to a charger. Hereinafter, in order to avoid overlapping descriptions, some of the constituent elements of the battery pack 1b according to the third example embodiment, which are the same as or similar to those of the battery pack 1a of FIG. 1, will be omitted.

Referring to FIG. 5, in the battery pack 1b according to the third example embodiment, the thermoelectric element power supply circuit 23 of the BMS module 20 may further include a voltage converter 232.

The voltage converter 232 may be electrically connected to the pack terminals P+ and P−, and when the voltage DC1 of the charger 5 is input through the pack terminals P+ and P−, the voltage may be dropped to output a voltage DC1' for driving the thermoelectric element.

The switch 231 may include a first input terminal to which the voltage DC1 of the charger 5 is input after being dropped by the voltage converter 232, a second input terminal to which the internal voltage DC2 of the battery pack 1b is input, and an output terminal for output of voltage to a cell module control circuit 12, and the switch 231 may select and output one of an output voltage DC1' of the voltage converter 232 and the internal voltage DC2 of the battery pack 1b under the control of the controller 21.

Accordingly, the thermoelectric element power supply circuit 23 drops the voltage DC1 of the charger 5 in the charging mode and transfers it to the cell module control circuit 12, and may transfer the internal voltage DC2 of the battery pack 1b to the cell module control circuit 12 in the discharge mode.

The internal voltage DC2 of battery pack 1*b* may be a voltage obtained by dropping a voltage supplied by the cell modules 10, a voltage supplied by some of the cell modules 10 constituting the battery pack 1*b*, or a voltage supplied by a separate low voltage battery module.

Figure 6:
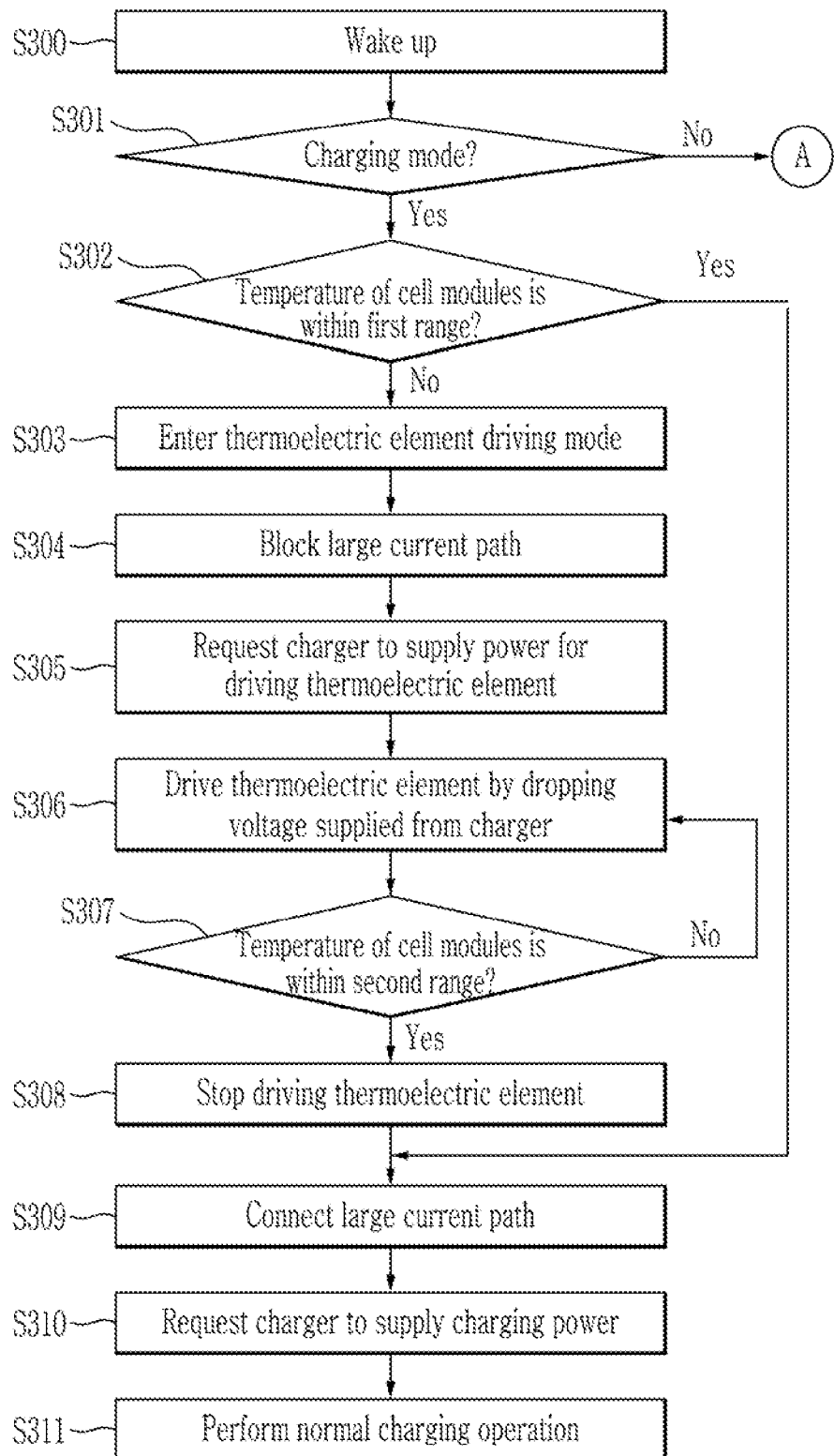
FIG. 6 schematically illustrates a control method of the battery pack according to the third example embodiment.

FIG. 6 schematically illustrates a control method of the battery pack according to the third example embodiment. The control method of FIG. 6 may be performed by the battery pack 1*b* of FIG. 5. Hereinafter, in order to avoid overlapping descriptions, some of the operations of the control method according to the third example embodiment, which are the same as or similar to those of the control method of FIG. 2A, will be omitted.

Referring to FIG. 6, as the battery pack 1*b* wakes up (S300), the controller 21 of the battery pack 1*b* determines whether a current operation mode of the battery pack 1*b* is a charging mode (S301). Then, when the current operation mode of the battery pack 1*b* is the charging mode, it is determined whether a temperature of the cell modules 10 is within a predetermined first range (S302).

In operation S302, when the temperature of the cell modules 10 is within the predetermined first range, the controller 21 controls the main switch 22 to be in an ON state to connect a large current path (S309), and requests the charger 5 to supply power for charging (S310). The charger 5 receiving this request supplies a charging voltage to the battery pack 1*b*, and a normal charging operation of the cell modules 10 is performed by the power supplied from the charger 5 (S311). When the main switch 22 is already on, operation S309 may be omitted.

On the other hand, in operation S302, when the controller 21 determines that the temperature of the cell modules 10 is out of the predetermined first range, the controller 21 enters a thermoelectric element driving mode S303. In addition, the controller 21 blocks the large current path by controlling the main switch 22 to be in an OFF state in order to block charging while the thermoelectric element driving mode is operated (S304). When the main switch 22 is already off, operation S304 may be omitted.

In addition, as the controller 21 enters the thermoelectric element driving mode, the controller 21 requests the charger 5 to supply the power for driving the thermoelectric element 11 through CAN communication or the like (S305). The charger 5 receiving this request outputs the voltage DC1 for driving the thermoelectric element 11 to the battery pack 1*b*, and the thermoelectric element power supply circuit 23 drives the thermoelectric elements 11 by dropping the voltage DC1 applied from the charger 5 through the voltage converter 232 and transferring it to the thermoelectric elements 11 (S306). The voltage DC1 applied for driving the thermoelectric element 11 from the charger 5 may be equal to or lower than the voltage that is applied for charging the cell modules 10 from the charger 5.

In operation S306, the controller 21 may control the cell module control circuits 12 to control the thermoelectric elements 11 to operate alternately. When a number of thermoelectric elements 11 disposed in the battery pack 1*b* is large, a large current may be consumed by the thermoelectric elements 11. Accordingly, the controller 21 may reduce an amount of current consumed at one time for driving the thermoelectric elements 11 by dividing the thermoelectric elements 11 into a plurality of groups (e.g., odd and even groups), and controlling the cell module control circuits 12 such that each group operates alternately.

Subsequently, when the temperature of the cell modules 10 is within the second range due to the driving of the thermoelectric elements 11 (S307), the controller 21 controls the thermoelectric element power supply circuit 23 and the cell module control circuits 12 to allow the driving of the thermoelectric elements 11 to be stopped (S308). In addition, the large current path is connected by turning on the main switch 22 (S309), and the charging power is requested to be supplied by to the charger 5 through the CAN communication or the like (S310). The charger 5 receiving this request outputs a charging voltage to the battery pack 1*b*, and a normal charging operation of the cell modules 10 is performed by the power applied from the charger 5 (S311).

In the control method of the battery pack according to the third example embodiment, when the battery pack 1*b* operates in the discharge mode, the thermoelectric element 11 is driven or the cell modules 10 are discharged in the same manner as the control method described with reference to FIG. 2B. Therefore, in order to avoid overlapping descriptions, the description of the control method when the battery pack 1*b* operates in the discharge mode will be omitted in the control method of the battery pack 1*b* according to the third example embodiment.

In the above-described third example embodiment, in the charging mode, the controller 21 in the battery pack 1*b* determines whether the thermoelectric element 11 is driven based on the temperature of the cell modules 10, and the charger 5 supplies the power for driving the thermoelectric element 11 in response to the request of the battery pack 1*c*, but the charger 5 instead of the battery pack 1*b* may determine whether the thermoelectric element of the battery pack 1*b* is driven.

Figure 7:
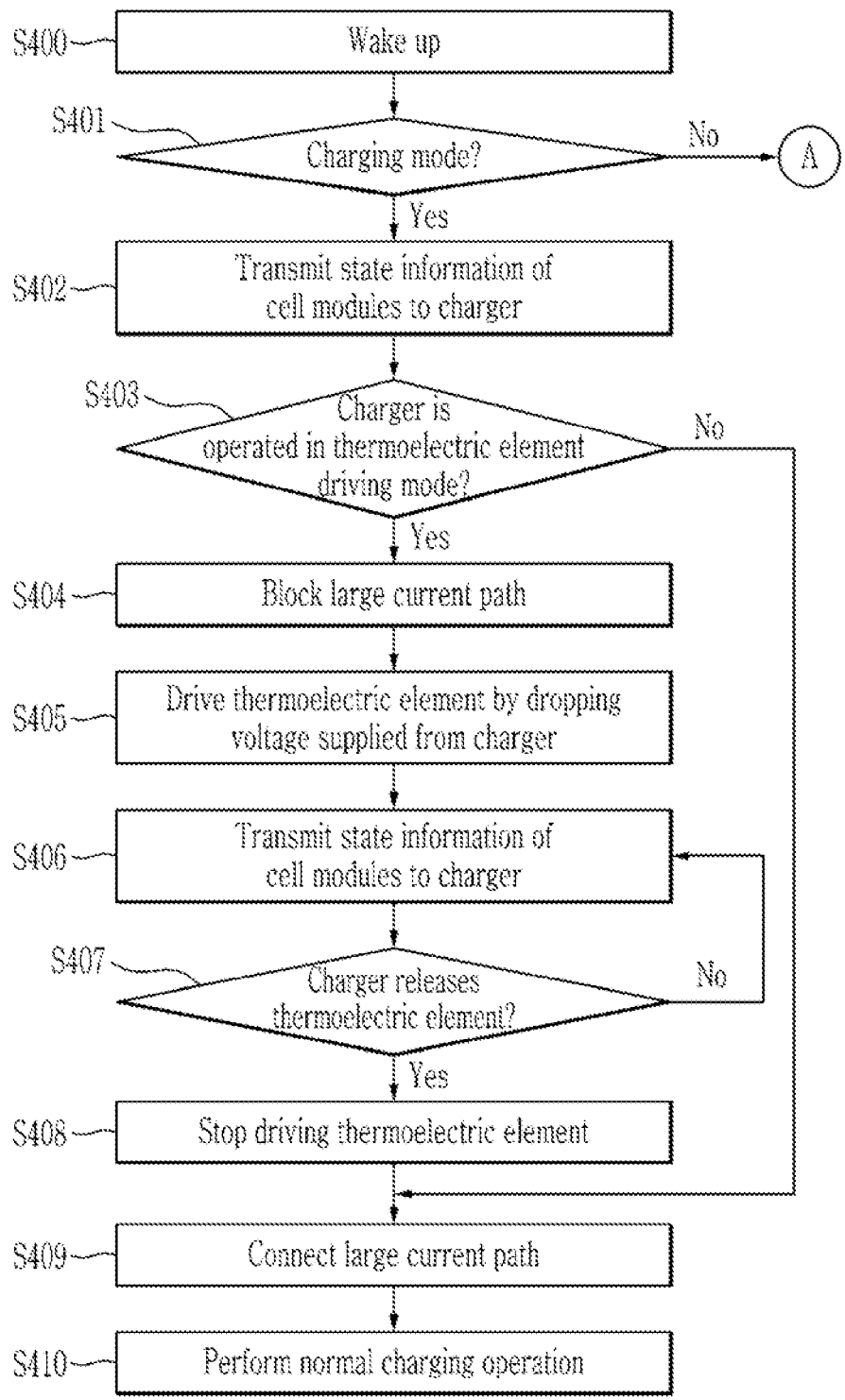
FIG. 7 schematically illustrates a control method of a battery pack according to a fourth example embodiment.

FIG. 7 schematically illustrates a control method of a battery pack according to a fourth example embodiment, which illustrates a case of determining whether to drive the thermoelectric element by the charger of FIG. 5. The control method of FIG. 7 may be performed by the battery pack 1*b* of FIG. 5.

In the control method of the battery pack according to the fourth example embodiment, when the battery pack 1*b* operates in the discharge mode, the thermoelectric element 11 is driven or discharged in the same manner as the control method described with reference to FIG. 2B. Therefore, in order to avoid overlapping descriptions, the description of the control method when the battery pack 1*b* operates in the discharge mode will be omitted in the control method of the battery pack 1*b* according to the fourth example embodiment.

In addition, according to the fourth example embodiment, the battery pack charging method of the charger 5 is the same as the battery pack charging method described with reference to FIG. 4 described above. Therefore, in order to avoid overlapping descriptions, the description of the control method when the battery pack 1*b* operates in the discharge mode will be omitted in the control method of the battery pack 1*b* according to the fourth example embodiment.

Referring to FIG. 7, as the battery pack 1*b* wakes up (S400), the controller 21 of the battery pack 1*b* determines whether a current operation mode of the battery pack 1*b* is a charging mode (S401). When the current operation mode of the battery pack 1*b* is the charging mode, state information (cell voltage, temperature, etc.) of the cell modules 10 is transmitted to the charger 5 through the CAN communication (S402).

As the charger 5 receives the state information of the cell modules 10 from the battery pack 1*b* (see S220 of FIG. 4), it is determined based on the state information whether the temperature of the cell modules 10 is within a predetermined first range (see S221 of FIG. 4). Then, when it is determined that the temperature of the cell modules 10 is out of the predetermined first range, the cell module 10 enters the thermoelectric element driving mode (see S222 of FIG. 4) and supplies the voltage DC1 for driving the thermoelectric element 11 to the battery pack 1b (see S223 of FIG. 4). On the other hand, when the temperature of the cell modules 10 is determined to be within the first range, the charger 5 directly supplies the charging voltage to the battery pack 1b without driving the thermoelectric element 11 (see S227 of FIG. 4). The voltage DC1 supplied for driving the thermoelectric element 11 from the charger 5 may be equal to or lower than the voltage supplied for charging the cell modules 10 from the charger 5.

The controller 21 of the battery pack 1b blocks the large current path (S404) by controlling the main switch 22 to the OFF state in order to block the charging when the charger 5 operates in the thermoelectric driving mode (S403). In addition, the thermoelectric element power supply circuit 23 drops the voltage DC1 for driving the thermoelectric element supplied from the charger 5 and then transfers it to the thermoelectric elements 11 under the control of the controller 21 to drive the thermoelectric elements 11 (S405). When the main switch 22 is already off, operation S404 may be omitted.

In operation S405, the controller 21 may control the cell module control circuits 12 to control the thermoelectric elements 11 to operate alternately. When a number of thermoelectric elements 11 disposed in the battery pack 1b is large, a large current may be consumed by the thermoelectric elements 11. Accordingly, the controller 21 may reduce an amount of current consumed at one time for driving the thermoelectric elements 11 by dividing the thermoelectric elements 11 into a plurality of groups (e.g., odd and even groups), and controlling the cell module control circuits 12 such that each group operates alternately.

Meanwhile, the controller 21 of the battery pack 1b may continuously or regularly collect state information of the cell modules 10 while driving the thermoelectric element, and transmit the state information to the charger 5 (S406).

The charger 5 receives the state information of the cell modules 10 from the battery pack 1b (see S224 of FIG. 4) while operating in the thermoelectric element driving mode. Based on the state information, it is determined whether the temperature of the cell modules 10 is within a predetermined second range (see S225 of FIG. 4). Then, when the temperature of the cell modules 10 is within the second range, the thermoelectric element driving mode is released (see S226 of FIG. 4), and a charging voltage is supplied to the battery pack 1a (see S227 of FIG. 4).

When the charger 5 releases the thermoelectric element driving mode (S407), the controller 21 of the battery pack 1b controls the thermoelectric element power supply circuit 23 and the cell module control circuits 12 to stop the driving of the thermoelectric elements 11 (S408). In addition, the main switch 22 is turned on to connect the large current path (S409).

Accordingly, the normal charging operation of the cell modules 10 is performed by the charging voltage supplied from the charger 5 (S410).

In the above-described first to fourth example embodiments, a case in which the battery packs 1a and 1b receives the power for driving the thermoelectric element has been described, but the battery pack may receive the power for driving the thermoelectric element from the charger 5 through separate DC input terminals.

Figure 8:
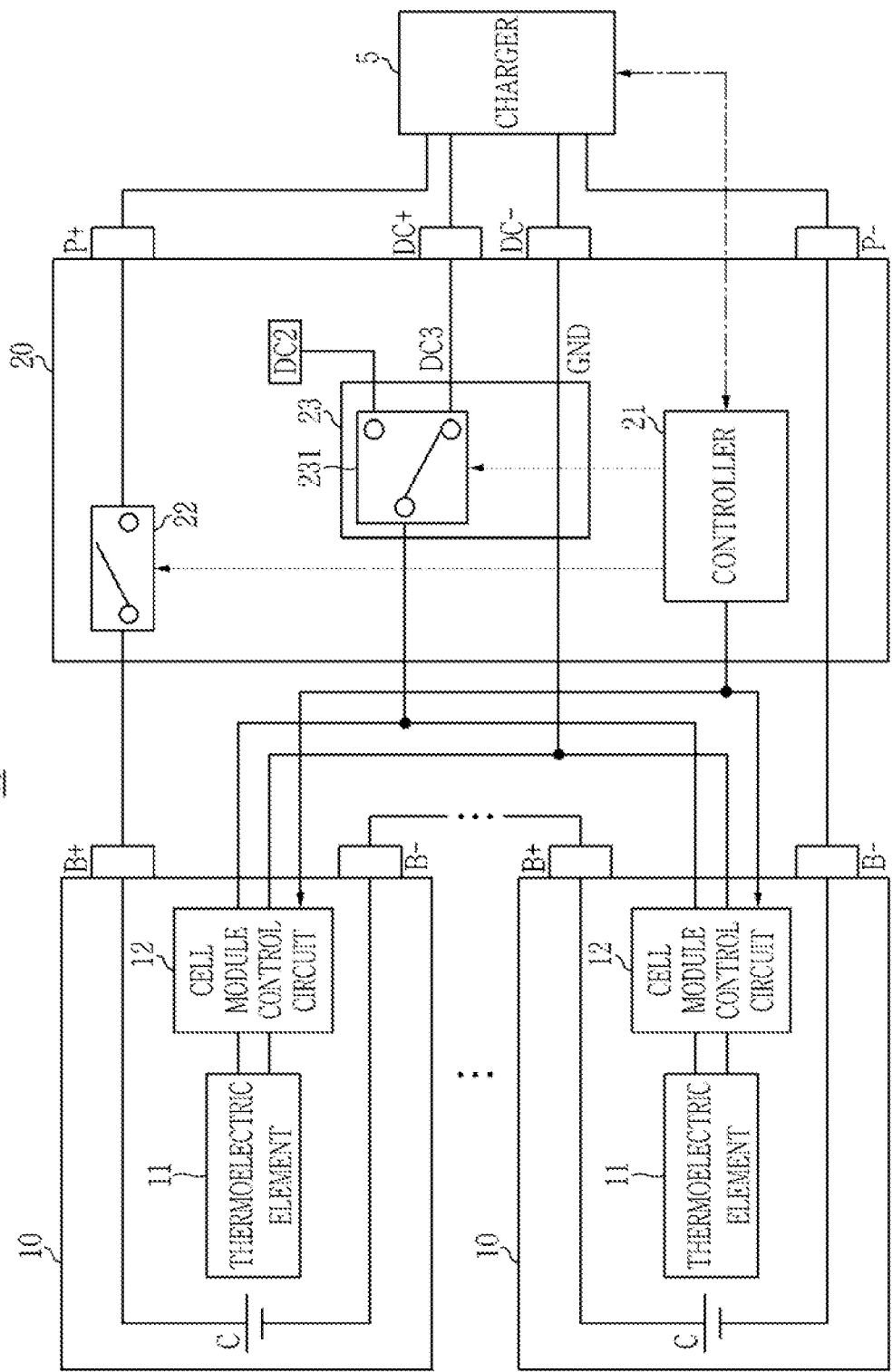
FIG. 8 schematically illustrates a battery pack according to a fifth example embodiment, in which the battery pack is connected to a charger.

FIG. 8 schematically illustrates a battery pack according to a fifth example embodiment, which is a battery pack connected to a charger. Hereinafter, in order to avoid overlapping descriptions, some of the constituent elements of the battery pack 1c according to the fifth example embodiment, which are the same as or similar to those of the battery pack 1a of FIG. 1, will be omitted.

Referring to FIG. 8, the battery pack 1c according to the fifth example embodiment may further include separate DC input terminals DC+ and DC− in addition to the pack terminals P+ and P−, and the voltage for driving the thermoelectric element 11 may be input from the charger 5 through the DC input terminals DC+ and DC−.

The thermoelectric element power supply circuit 23 includes a switch 231, e.g., a single pole double throw (SPDT) switch, including a first input terminal electrically connected to the DC input terminal DC+ to which the voltage DC3 supplied from the charger 5 is input other than the pack terminal P+, a second input terminal to which the internal voltage DC2 of the battery pack 1a is input, and an output terminal for output of a voltage to the cell module control circuit 12.

The switch 231 may transfer the voltage DC3 supplied from the charger 5 to the cell module control circuit 12 through the DC input terminal DC+ when the thermoelectric element 11 is to be driven in the charging mode. The switch 231 may transfer the internal voltage DC2 of the battery pack 1c to the cell module control circuit 12 when the thermoelectric element 11 is to be driven in the discharging mode. The voltage input from the charger 5 through the DC input terminals DC+ and DC− may be lower than the voltage that is applied from the charger 5 through the pack terminals P+ and P−.

Figure 9:
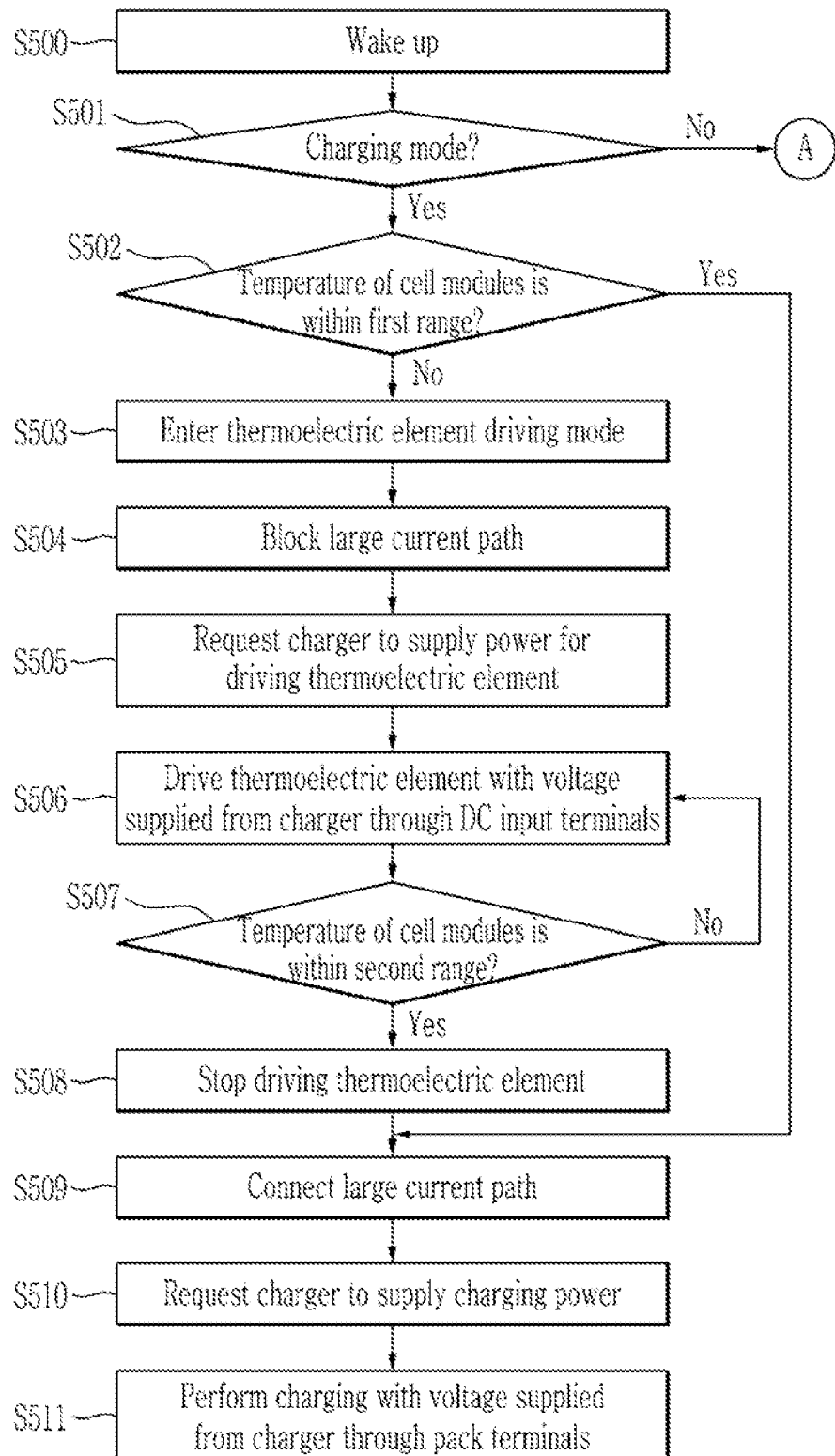
FIG. 9 schematically illustrates a control method of the battery pack according to the fifth example embodiment.

FIG. 9 schematically illustrates a control method of the battery pack according to the fifth example embodiment. The control method of FIG. 9 may be performed by the battery pack 1c of FIG. 8. Hereinafter, in order to avoid overlapping descriptions, some of the operations of the control method according to the fifth example embodiment, which are the same as or similar to those of the control method of FIG. 2A, will be omitted.

Referring to FIG. 9, as the battery pack 1c wakes up (S500), the controller 21 of the battery pack 1c determines whether a current operation mode of the battery pack 1c is a charging mode (S501). Then, when the current operation mode of the battery pack 1c is the charging mode, it is determined whether a temperature of the cell modules 10 is within a predetermined first range (S502).

In operation S502, when the temperature of the cell modules 10 is within the predetermined first range, the controller 21 controls the main switch 22 to be in an ON state to connect the large current path (S509), and requests the charger 5 to supply power for charging (S510). The charger 5 receiving this request supplies the charging voltage to the battery pack 1c, and the charging of the cell modules 10 is performed by the voltage supplied from the charger 5 through the pack terminals P+ and P− (S511). When the main switch 22 is already on, operation S509 may be omitted.

On the other hand, in operation S502, when the controller 21 determines that the temperature of the cell modules 10 is out of the predetermined first range, the controller 21 enters a thermoelectric element driving mode (S503). In addition, the controller 21 blocks the large current path by controlling the main switch 22 to be in an OFF state in order to block charging while the thermoelectric element driving mode is operated (S504). When the main switch 22 is already off, operation S504 may be omitted.

In addition, as the controller 21 enters the thermoelectric element driving mode, the controller 21 requests the charger 5 to supply the power for driving the thermoelectric element 11 through CAN communication or the like (S505). The charger 5 receiving this request outputs a voltage DC3 for driving the thermoelectric element 11 to the battery pack 1c through DC output terminals separate from charging output terminals. The voltage DC3 for driving the thermoelectric element outputted through the separate DC output terminals of the charger 5 is transferred to the thermoelectric element power supply circuit 23 through the DC input terminals DC+ and DC− of the battery pack 1c, and the thermoelectric element power supply circuit 23 transfers the voltage DC3 to the thermoelectric elements 11 to drive the thermoelectric elements 11 (S506). The voltage DC3 input from the charger 5 through the separate DC input terminals DC+ and DC− may be lower than the voltage input from the charger 5 through the pack terminals P+ and P− for charging the cell modules 10.

In operation S506, the controller 21 may control the cell module control circuits 12 to control the thermoelectric elements 11 to operate alternately. When a number of thermoelectric elements 11 disposed in the battery pack 1c is large, a large current may be consumed by the thermoelectric elements 11. Accordingly, the controller 21 may reduce an amount of current consumed at one time for driving the thermoelectric elements 11 by dividing the thermoelectric elements 11 into a plurality of groups (e.g., odd and even groups), and controlling the cell module control circuits 12 such that each group operates alternately.

Subsequently, when the temperature of the cell modules 10 is within the second range due to the driving of the thermoelectric elements 11 (S507), the controller 21 controls the thermoelectric element power supply circuit 23 and the cell module control circuits 12 to allow the driving of the thermoelectric elements 11 to be stopped (S508). In addition, the large current path is connected by turning on the main switch 22 (S509), and the charging power is requested to be supplied to the charger 5 by a request through the CAN communication (S510). The charger 5 receiving this request outputs the charging voltage to the battery pack 1c through charging output terminals, and the cell modules 10 are charged by the voltage supplied from the charger 5 through the pack terminals P+ and P− (S511).

In the control method of the battery pack according to the fifth embodiment, when the battery pack 1c operates in the discharge mode, the thermoelectric element 11 is driven or the cell modules 10 are discharged in the same manner as the control method described with reference to FIG. 2B. Therefore, in order to avoid overlapping descriptions, the description of the control method when the battery pack 1c operates in the discharge mode will be omitted in the control method of the battery pack 1c according to the fifth embodiment.

In the above-described fifth example embodiment, in the charging mode, the controller 21 in the battery pack 1c determines whether the thermoelectric element 11 is driven based on the temperature of the cell modules 10, and the charger 5 supplies the power for driving the thermoelectric element 11 in response to the request of the battery pack 1c, but the charger 5 instead of the battery pack 1c may determine whether the thermoelectric element of the battery pack 1c is driven.

Figure 10:
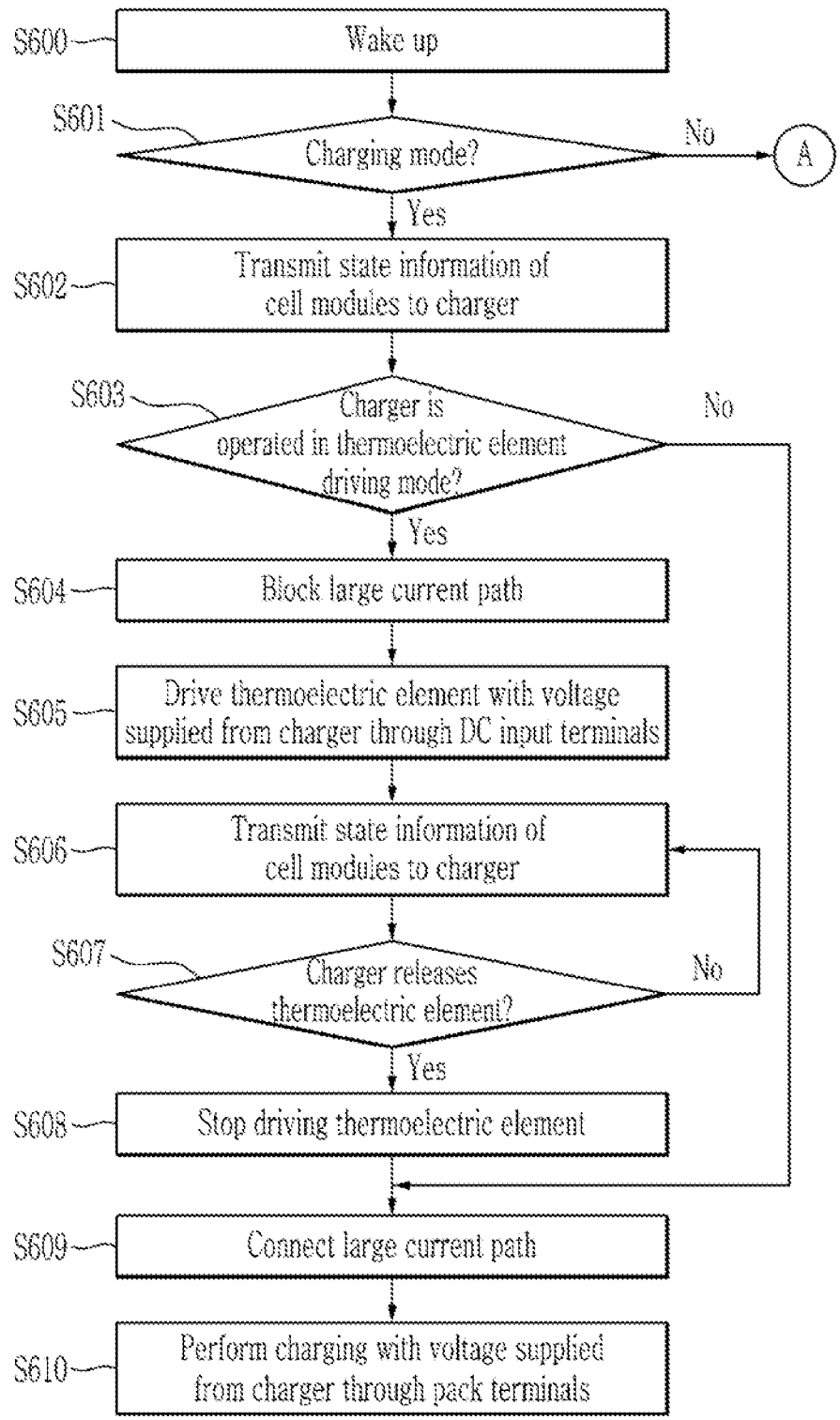
FIG. 10 schematically illustrates a control method of a battery pack according to a sixth example embodiment.
Figure 11:
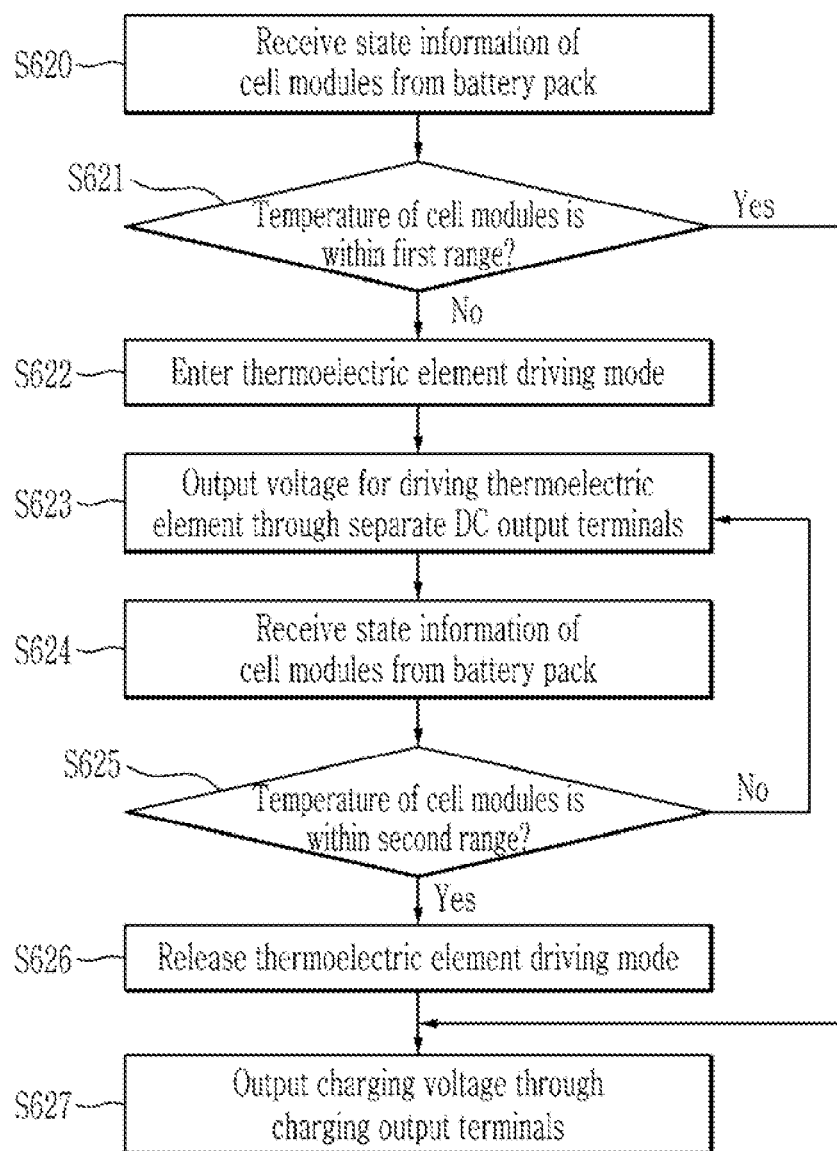
FIG. 11 schematically illustrates a battery pack charging method of a charger according to the sixth example embodiment.

FIG. 10 schematically illustrates a control method of a battery pack according to a sixth example embodiment, and FIG. 11 schematically illustrates a battery pack charging method of a charger according to the sixth example embodiment, which illustrate a case of determining whether to drive the thermoelectric element by the charger of FIG. 8. The control method of FIG. 10 and the battery pack charging method of FIG. 11 may be performed by the battery pack 1c and the charger 5 of FIG. 8, respectively.

Referring to FIG. 10 and FIG. 11, as the battery pack 1c wakes up (S600), the controller 21 of the battery pack 1c determines whether a current operation mode of the battery pack 1c is a charging mode (S601). When the current operation mode of the battery pack 1c is the charging mode, state information (cell voltage, temperature, etc.) of the cell modules 10 is transmitted to the charger 5 through the CAN communication (S602).

As the charger 5 receives the state information of the cell modules 10 from the battery pack 1c (S620), it is determined based on the state information whether the temperature of the cell modules 10 is within a predetermined first range (S621). Then, when it is determined that the temperature of the cell modules 10 is out of the predetermined first range, the cell module 10 enters the thermoelectric element driving mode (S622) and supplies the voltage DC3 for driving the thermoelectric element 11 to the battery pack 1c through separate DC output terminals (S623). On the other hand, in operation S621, when the temperature of the cell modules 10 is determined to be within the first range, the charger 5 directly supplies the charging voltage to the battery pack 1c through charging output terminals without driving the thermoelectric element 11 (S627).

In operation S623 and operation S627, the voltage DC3 outputted for driving the thermoelectric element 11 from the charger 5 to the DC output terminals may be lower than the voltage outputted for charging the cell modules 10 from the charger 5 through the charging output terminals.

The controller 21 of the battery pack 1c blocks the large current path (S604) by controlling the main switch 22 to the OFF state in order to block the charging when the charger 5 operates in the thermoelectric driving mode (S603). In addition, the thermoelectric element power supply circuit 23 transfers the voltage DC3 for driving the thermoelectric element input from the charger 5 to the thermoelectric elements 11 through the DC input terminals DC+ and DC− under the control of the controller 21 to drive the thermoelectric elements 11 (S605). When the main switch 22 is already off, operation S604 may be omitted.

In operation S603, the controller 21 of the battery pack 1c may recognize that the charger 5 operates in the thermoelectric element driving mode based on information received from the charger 5 through the CAN communication or the like.

In operation S605, the controller 21 may control the cell module control circuits 12 to control the thermoelectric elements 11 to operate alternately. When a number of thermoelectric elements 11 disposed in the battery pack 1c is large, a large current may be consumed by the thermoelectric elements 11. Accordingly, the controller 21 may reduce an amount of current consumed at one time for driving the thermoelectric elements 11 by dividing the thermoelectric elements 11 into a plurality of groups (e.g., odd and even groups), and controlling the cell module control circuits 12 such that each group operates alternately.

Meanwhile, the controller 21 of the battery pack 1c may continuously or regularly collect state information of the cell modules 10 while driving the thermoelectric element, and transmit the state information to the charger 5 (S606).

The charger 5 receives the state information of the cell modules 10 from the battery pack 1c (S624) while operating in the thermoelectric element driving mode, and it is determined based on the state information whether the temperature of the cell modules 10 is within a predetermined second range (S625). Then, when the temperature of the cell modules 10 is within the second range, the thermoelectric element driving mode is canceled by stopping outputting the voltage for driving the thermoelectric element 11 through the DC output terminals (S626), and the charging voltage is outputted to the battery pack 1c through the charging output terminals (S627).

When the charger 5 releases the thermoelectric element driving mode (S607), the controller 21 of the battery pack 1c controls the thermoelectric element power supply circuit 23 and the cell module control circuits 12 to stop the driving of the thermoelectric elements 11 (S608). In addition, the main switch 22 is turned on to connect the large current path (S609). Accordingly, charging of the cell modules 10 is performed by the charging voltage supplied from the charger 5 through the pack terminals P+ and P− (S610).

In operation S607, the controller 21 of the battery pack 1c may recognize that the charger 5 releases the thermoelectric element driving mode based on information received from the charger 5 through the CAN communication or the like.

In the control method of the battery pack according to the sixth embodiment, when the battery pack 1c operates in the discharge mode, the thermoelectric element 11 is driven or discharged in the same manner as the control method described with reference to FIG. 2B. Therefore, in order to avoid overlapping descriptions, the description of the control method when the battery pack 1c operates in the discharge mode will be omitted in the control method of the battery pack 1c according to the sixth embodiment.

In the above-described first to sixth example embodiments, a case in which the thermoelectric element 11 is driven by the internal voltage of the charger 5 or the battery packs 1a, 1b, and 1c has been described, but the thermoelectric element 11 may be driven by a voltage supplied by itself from the cell module 10 in which the thermoelectric element 11 is installed.

Figure 12:
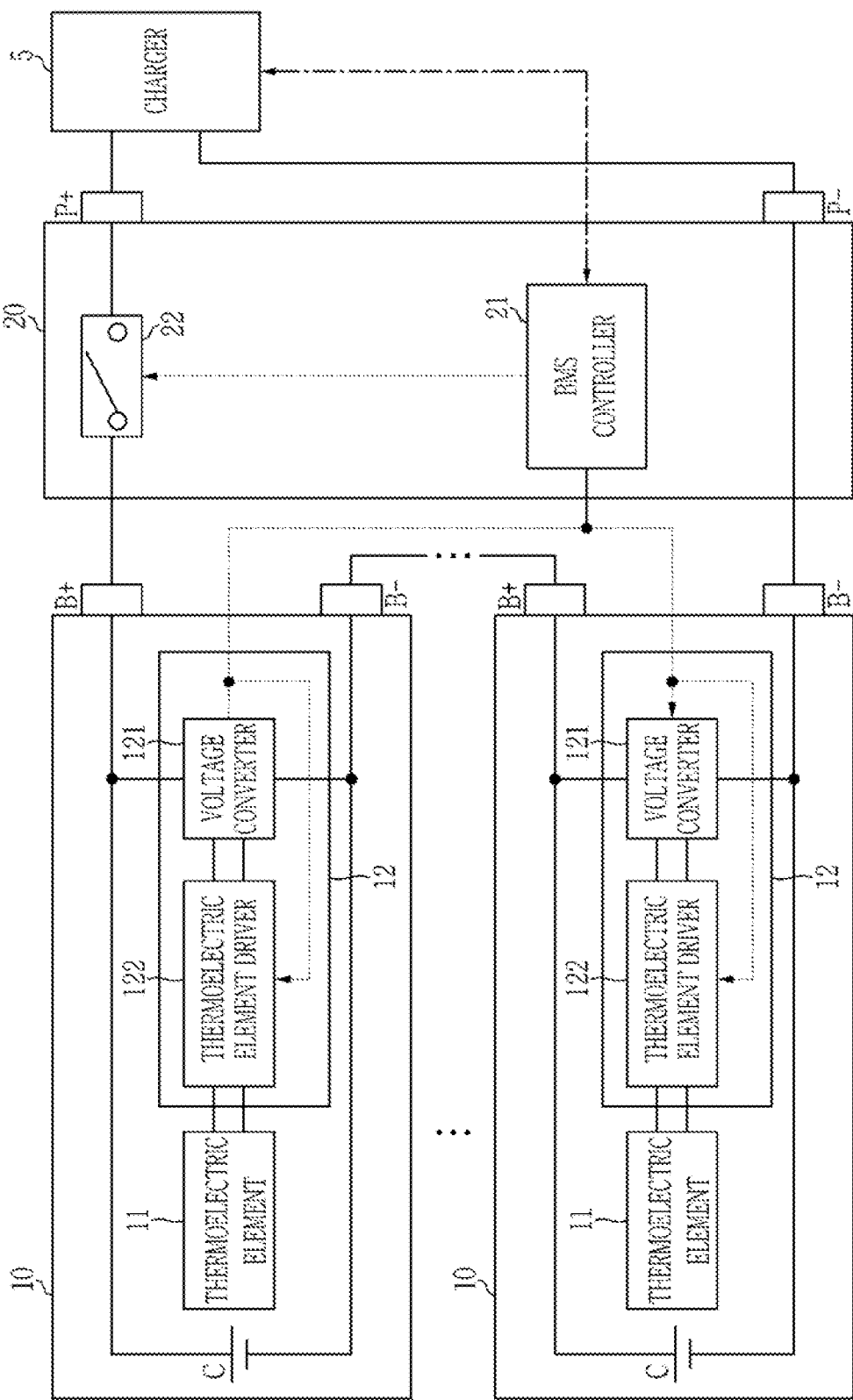
FIG. 12 schematically illustrates a battery pack according to a seventh example embodiment.

FIG. 12 schematically illustrates a battery pack according to a seventh example embodiment, and illustrates a battery pack connected to a charger. In the following, in order to avoid overlapping descriptions, among the constituent elements of the battery pack 1d according to the seventh example embodiment, detailed descriptions of constituent elements that are the same as or similar to those of the battery pack 1a in FIG. 1 are omitted.

Referring to FIG. 12, in the battery pack 1d according to the seventh example embodiment, the cell module control circuit 12 of each cell module 10 may include a voltage converter 121 and a thermoelectric element driver 122.

The voltage converter 121 includes input terminals connected to opposite electrodes of the rechargeable battery cell C in the cell module 10 in which the voltage converter 121 is disposed and output terminals connected to the thermoelectric element driver 122, and the voltage at opposite ends of the rechargeable battery cell C may be boosted and output to the thermoelectric element driver 122.

The thermoelectric element driver 122 may control driving of the thermoelectric element 11 based on a control signal of a controller 21. Thus, the thermoelectric element driver 122 may activate or deactivate the thermoelectric element 11 by transferring the voltage outputted from the voltage converter 121 to the thermoelectric element 11 or blocking the voltage based on the control signal received from the controller 21. In addition, the thermoelectric element driver 122 may control the heat dissipation or heat absorption of the thermoelectric element 11 by adjusting the direction of the current applied to the thermoelectric element 11 based on the control signal received from the controller 21.

When the thermoelectric element 11 is to be driven in the charging mode, the controller 21 may control the voltage converter 121 and the thermoelectric element driver 122 to supply the driving voltage to the thermoelectric element 11. In addition, the controller 21 may transfer a control signal indicating the direction of the current supplied to the thermoelectric element 11 to the thermoelectric element driver 122 depending on a desired operation among heating and cooling when the thermoelectric element 11 is to be driven.

Figure 13:
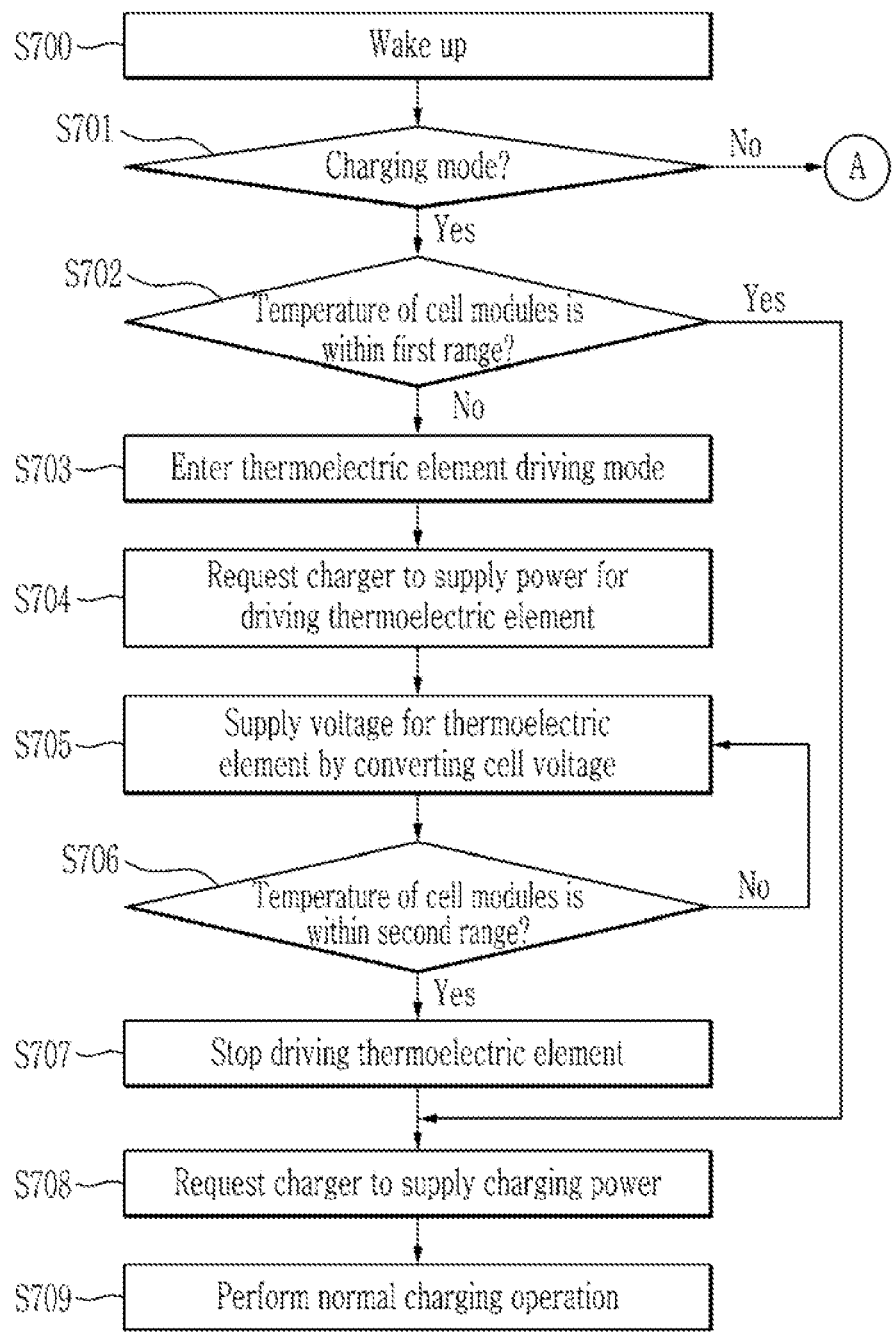
FIG. 13 schematically illustrates a control method of the battery pack according to the seventh example embodiment.

FIG. 13 schematically illustrates a control method of a battery pack according to a seventh example embodiment. The control method of FIG. 13 may be performed by the battery pack 1d of FIG. 12.

Referring to FIG. 13, as the battery pack 1d wakes up (S700), the controller 21 of the battery pack 1d determines whether a current operation mode of the battery pack 1d is a charging mode (S701). Then, when the current operation mode of the battery pack 1d is the charging mode, it is determined whether a temperature of the cell modules 10 is within a predetermined first range (S702).

In operation S702, when the temperature of the cell modules 10 is within a predetermined first range, the controller 21 requests the charger 5 to supply power for charging (S708), and the normal charging operation of the cell modules 10 is performed by using the charging power supplied from the charger 5 (S709). In this case, the main switch 22 may be in the ON state to transfer the charging current supplied from the charger 5 to cell modules 10, and operation S708 may be omitted when the charger 5 is already supplying the charging power.

On the other hand, in operation S702, when the controller 21 determines that the temperature of the cell modules 10 is out of the predetermined first range, the controller 21 enters the thermoelectric element driving mode (S703), and requests the charger 5 to supply the power for driving the thermoelectric element 11 by a request through the CAN communication (S704). The charger 5 receiving this request supplies the power for driving the thermoelectric element 11 to the battery pack 1d through the pack terminals P+ and P−. The charger 5 supplies a current to the battery pack 1d as much as current consumption of the thermoelectric elements 11 in order to prevent overcharging or over-discharging of each rechargeable battery cell C due to the driving of the thermoelectric elements 11.

In addition, as the controller 21 enters the thermoelectric element driving mode, the controller 21 may control the voltage converter 121 and the thermoelectric element driver 122 in each cell module 10 to supply the driving power of the thermoelectric element 11 from the corresponding rechargeable battery cell C (S705). In this case, the main switch 22 is in the ON state to transfer the current for driving the thermoelectric element 11 supplied from the charger 5 to the cell modules 10.

In operation S705, the controller 21 may determine whether cooling or heating is called for depending on the temperature of the cell modules 10, and may control the thermoelectric element driver 122 depending on the determination result to control the direction of the current supplied to the thermoelectric element 11.

In operation S705, the controller 21 may control the voltage converters 121 and the thermoelectric element driver 122 of each cell module 10 to alternately operate the thermoelectric elements 11. When a number of thermoelectric elements 11 disposed in the battery pack 1d is large, a large current may be consumed by the thermoelectric elements 11. Accordingly, the controller 21 may reduce an amount of current consumed at one time for driving the thermoelectric elements 11 by dividing the thermoelectric elements 11 into a plurality of groups (e.g., odd and even groups), and controlling the voltage converter 121 and the thermoelectric element driver 122 of each cell module 10 such that each group operates alternately.

Subsequently, when the temperature of the cell modules 10 is within the second range due to the driving of the thermoelectric elements 11 (S706), the controller 21 controls the voltage converter 121 and the thermoelectric element driver 122 of each cell module 10 to stop driving of the thermoelectric elements 11 (S707). In addition, requesting the charger 5 to supply charging power by a request through CAN communication or the like is performed (S708). The charger 5 receiving this request outputs a charging current to the battery pack 1d and normal charging of the cell modules 10 is performed by the current applied from the charger 5 (S709).

According to the aforementioned first to seventh example embodiments, the charging efficiency in a low temperature environment may be improved by disposing the thermoelectric elements 11 in each cell module 10 and absorbing or dissipating heat using the thermoelectric elements 11 depending on the temperature of the cell modules 10. In addition, improved operation reliability of the battery pack in a low temperature environment and a high temperature environment may be obtained, so that the battery pack may be used when mounted in outdoor products that are exposed to the low and high temperature environments.

In addition, in the aforementioned first and second example embodiments, in the thermoelectric element driving mode, the charger 5 may directly drop the supply voltage to supply it to the battery pack 1a so that a voltage conversion circuit for converting the voltage supplied from the charger 5 into the thermoelectric element driving voltage need not be included, thereby reducing the size and unit cost of the battery pack 1a.

In addition, in the aforementioned fifth and sixth example embodiments, in the thermoelectric element driving mode, the charger 5 may supply the voltage that is adjusted as the voltage for driving the thermoelectric element 11 to the battery pack 1a through separate DC input terminals DC+ and DC so that a voltage conversion circuit for converting the voltage supplied from the charger 5 into the thermoelectric element driving voltage need not be included, thereby reducing the size and unit cost of the battery pack 1c.

In addition, in the aforementioned seventh example embodiment, a circuit for supplying driving power of the thermoelectric element 11 may be implemented in the cell module 10 so that a separate power cable connection for driving the thermoelectric element 11 between the BMS module 20 and each cell module 10 is unnecessary, which simplifies the connection structure of the battery pack 1d and thereby reduces the unit cost.

By way of summation and review, light electric vehicles (LEVs) may include vehicles such as electric motorbikes, electric wheelchairs, electric golf carts, and electric forklifts. A battery pack mounted on such a LEV may include a plurality of battery modules connected in series or in parallel. A battery management system (BMS) may be mounted in the battery pack to protect the battery pack by detecting voltages, temperatures, and charge/discharge currents of each cell or battery module. A battery pack mounted in the LEV may include a thermal management system to secure operational reliability of the battery pack in a low temperature or high temperature environment, and to protect the battery pack from heat during rapid charging at, e.g., a 1 C rate or more.

As described above, embodiments may provide a battery pack and a battery pack control method that can ensure operation reliability of the battery pack in a low or high temperature environment or during rapid charging. Embodiments may allow for charging efficiency of the battery pack in a low temperature environment may be increased. Embodiments may provide for operation reliability of the battery pack in a low temperature environment and a high temperature environment, so that the battery pack may be used by being mounted in outdoor products that are frequently exposed to the low and high temperature environments.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

DESCRIPTION OF SYMBOLS 1a, 1b, 1c, 1d: battery pack
5: charger
10: cell module
11: thermoelectric element
12: cell module control circuit
20: BMS module
21: controller
22: main switch
23: thermoelectric element power supply circuit
121, 232: voltage converter
122: thermoelectric element driver
231: switch
C: rechargeable battery cell
P+, P−: pack terminals
B+, B−: opposite cell module terminals
DC+, DC−: DC input terminals

What is claimed is:

1. A battery pack having at least one cell module that is connected between a plurality of pack terminals, the battery pack comprising:
   at least one thermoelectric element disposed at each of the at least one cell module;
   at least one cell module control circuit disposed at each of the at least one cell module;
   a thermoelectric element power supply circuit including a voltage converter configured to convert a voltage input through the pack terminals and indirectly transfer a converted voltage as a driving voltage to the at least one thermoelectric element via the at least one cell module control circuit; and
   a controller separate from the at least one cell module control circuit and configured to control the voltage converter to transfer the driving voltage to the at least one thermoelectric element when a temperature of the at least one cell module is out of a first range in a charging mode.

2. The battery pack of claim 1, wherein the controller requests a charger to supply power for driving the at least one thermoelectric element when the temperature of the at least one cell module is out of the first range in the charging mode.

3. The battery pack of claim 1, wherein:
the controller transmits state information including the temperature of the at least one cell module to a charger in the charging mode, and
the controller requests the charger to supply a voltage for driving the at least one thermoelectric element to the battery pack when the temperature of the at least one cell module is out of the first range.

4. The battery pack of claim 1, further comprising:
a main switch connected between any one of the pack terminals and the at least one cell module to control a flow of charge and discharge currents,
wherein the controller controls the main switch to be in an off state while voltage for driving the thermoelectric element is supplied from a charger in the charging mode.

5. The battery pack of claim 1, further comprising:
a control circuit disposed at each of the at least one cell modules to control a direction of a current supplied to the at least one thermoelectric element,
wherein the controller controls the control circuit to set the direction of the current supplied to the at least one thermoelectric element depending on the temperature of the at least one cell module.

6. The battery pack of claim 1, wherein the controller controls the thermoelectric element power supply circuit to transfer an internal voltage of the battery pack as the driving voltage of the at least one thermoelectric element when the temperature of the at least one cell module is out of a third range in a discharge mode.

\* \* \* \* \*